(12) United States Patent
May et al.

(10) Patent No.: US 11,206,839 B2
(45) Date of Patent: Dec. 28, 2021

(54) STABILIZED WHOLE GRAIN FLOUR AND FLOUR PRODUCTS

(71) Applicant: Campbell Soup Company, Camden, NJ (US)

(72) Inventors: Natalie May, Beverly Hills (AU); Daniel Edward Mullette, Toongabbie (AU)

(73) Assignee: Campbell Soup Company, Camden, NJ (US)

( * ) Notice: Subject to any disclaimer, the term of this patent is extended or adjusted under 35 U.S.C. 154(b) by 31 days.

(21) Appl. No.: 16/184,343

(22) Filed: Nov. 8, 2018

(65) Prior Publication Data

US 2019/0216103 A1    Jul. 18, 2019

Related U.S. Application Data

(60) Provisional application No. 62/583,158, filed on Nov. 8, 2017.

(51) Int. Cl.
*A21D 13/02* (2006.01)
*A23L 7/10* (2016.01)
(Continued)

(52) U.S. Cl.
CPC .............. *A21D 13/02* (2013.01); *A21D 6/003* (2013.01); *A23L 7/115* (2016.08); *A23L 7/197* (2016.08);
(Continued)

(58) Field of Classification Search
None
See application file for complete search history.

(56) References Cited

U.S. PATENT DOCUMENTS 2,971,265 A    2/1961  Young
3,852,892 A    12/1974 Sheehan
(Continued)

FOREIGN PATENT DOCUMENTS

JP    2005168451    6/2005
WO    2006127922    11/2006
(Continued)

OTHER PUBLICATIONS

McAllister: Influence of Starch Composition on Starch Damage Values Determined by Megazyme and SDmatic Methods; Cereal Chem. vol. 88, No. 4, 201: pp. 349-351. (Year: 2011).*

(Continued)

*Primary Examiner* — Patricia A George

(74) *Attorney, Agent, or Firm* — Pauly, DeVries Smith & Deffner LLC

(57) ABSTRACT

Embodiments herein relate to stabilized, whole-grain flour, food products including such stabilized, whole-grain flour, and methods of making stabilized, whole-grain flour and food products including the same. In an embodiment, a method of making a stable, whole grain flour is included. Whole grain wheat flour made using this method has shown exceptional biscuit and cracker making functionality producing high quality end products. The method can include tempering whole grain wheat and heating the tempered whole grain wheat at a temperature of about 120 degrees Celsius to about 160 degrees Celsius for about 5 to 20 minutes. The method can further include milling the whole grain to form a bran and germ fraction and a break flour fraction, fine milling the bran and germ fraction, and recombining the fine milled bran and germ fraction with the break flour fraction to produce a straight run flour. Other embodiments are also included herein.

10 Claims, 3 Drawing Sheets

(51) Int. Cl.
  *A21D 6/00* (2006.01)
  *B02C 9/04* (2006.01)
  *B02C 23/10* (2006.01)
(52) U.S. Cl.
  CPC ............... *A23L 7/198* (2016.08); *B02C 9/04* (2013.01); *B02C 23/10* (2013.01); *A23V 2002/00* (2013.01)

(56) References Cited

U.S. PATENT DOCUMENTS

| | | | |
|---|---|---|---|
| 3,974,298 | A | 8/1976 | Cauvain et al. |
| 4,737,371 | A | 4/1988 | Bookwalter |
| 5,033,371 | A * | 7/1991 | Satake ............... B02B 5/02 99/519 |
| 5,066,506 | A | 11/1991 | Creighton et al. |
| 6,616,957 | B1 | 9/2003 | Wilhelm et al. |
| 8,017,172 | B2 | 9/2011 | Arndt et al. |
| 8,173,193 | B2 | 5/2012 | Haynes et al. |
| 8,252,360 | B2 | 8/2012 | Arndt et al. |
| 8,404,298 | B2 | 3/2013 | Arndt et al. |
| 8,852,665 | B2 | 10/2014 | Arndt et al. |
| 9,392,811 | B2 | 7/2016 | Arndt et al. |
| 2005/0136173 | A1 | 6/2005 | Korolchuk |
| 2006/0073258 | A1 | 4/2006 | Korolchuk |
| 2014/0099421 | A1 | 4/2014 | Zhao et al. |
| 2014/0106052 | A1* | 4/2014 | Hawley ............... B02C 9/04 426/556 |
| 2016/0021899 | A1 | 1/2016 | Zhao et al. |

FOREIGN PATENT DOCUMENTS

| | | |
|---|---|---|
| WO | 2007149320 | 12/2007 |
| WO | 2012142399 | 3/2013 |
| WO | 2014149810 | 9/2014 |
| WO | 2016109422 | 7/2016 |
| WO | 2019094585 | 5/2019 |

OTHER PUBLICATIONS

Ping: Sorghum Grain Dry-Milling Experihents of Cold, Warm, Hot Conditioning; A Master'S Thesis for the Department of Grain Science and Industry at Kansas State University in Manhattan, Kansas; published 1976 (Year: 1976).*
Haynes2: WO 2007/149320; Production of Stabilized Whole Grain Flour and Products Thereof; published Dec. 27, 2007. (Year: 2007).*
Haynes: WO 2016/109422; Enzymatic Bran and Germ Flavor and Texture Improvement; published Jul. 7, 2016. (Year: 2016).*
Gutierrez: WO 2008/132238; published Nov. 6, 2008 (Year: 2008).*
Hazen: How the Roller Mills Changed the Milling Industry; published online at least by Dec. 2, 2001 at: https://web.archive.org/web/20011202085718/http://www.angelfire.com/journal/millrestoration/roller.html (Year: 2001).*
Eustace: Some effects of cold, warm and hot wheat condition. . . Kansas State University; 1962 (Year: 1962).*
"International Search Report and Written Opinion," for PCT Application No. PCT/US2018/059816 dated Mar. 14, 2019 (17 pages).
Kandil, Amin et al., "Compositional Changes in Whole Grain Flours as a Result of Solvent Washing and Their Effect on Starch Amylolysis," Food Research International vol. 44, 2011 (8 pages).
Lopez-Martinez, Leticia X. et al., "Antioxidant Activity, Phenolic Compounds and Anthocyanins Content of Eighteen Strains of Mexican Maize," LWT—Food Science and Technology 42 (2009) 1187-1192 (6 pages).
Rose, Devin J. et al., "Enhanced Lipid Stability in Whole Wheat Flour by Lipase Inactivation and Antioxidant Retention," Cereal Chemistry vol. 85, No. 2 (2008) 218-223 (6 pages).
Vadlamani, Keswara R. et al., "Reduced Browning in Raw Oriental Noodles by Heat and Moisture Treatment of Wheat," Cereal Chem. 73(1):88-95 (8 pages).

* cited by examiner

STABILIZED WHOLE GRAIN FLOUR AND FLOUR PRODUCTS

This application claims the benefit of U.S. Provisional Application No. 62/583,158, filed Nov. 8, 2017, the content of which is herein incorporated by reference in its entirety.

FIELD

Embodiments herein relate to stabilized, whole-grain flour, food products including such stabilized, whole-grain flour, and methods of making stabilized, whole-grain flour and food products including the same having superior flavor and texture.

BACKGROUND

In their natural state growing in the fields, whole grains are the entire seed of a plant. This seed (also called a "kernel" or "grain") is made up of three edible parts—the bran, the germ, and the endosperm—protected by an inedible husk that protects the kernel from sunlight, pests, water, and disease.

The bran is the multi-layered outer skin of the edible kernel. It contains important antioxidants, B vitamins and fiber. The germ is the embryo which has the potential to sprout into a new plant. It contains many B vitamins, some protein, minerals, and healthy fats. The endosperm is the germ's food supply, which provides essential energy to the young plant so it can send roots down for water and nutrients, and send sprouts up for sunlight's photosynthesizing power. The endosperm is by far the largest portion of the kernel. It contains starchy carbohydrates, proteins and small amounts of vitamins and minerals.

A wide range of species of wheat (genus *Triticum*) exist although only two are widely grown commercially and consumed. Durum wheat (*Triticum durum*) is used for pasta production, while bread or common wheat (*Triticum aestivum*) is used for most other wheat-based foods. Wheat is unique of all the cereals for its ability to form a visco-elastic dough capable of retaining gases during leavening, an important technological feature for most bakery products due to the presence of gluten forming proteins. Wheat is described as "hard" or "soft" according to its kernel hardness or protein content; as "winter" or "spring" according to when its sown; and as "red" or "white" according to color of the seed coat. Hard wheat has more protein, including more gluten, and is typically used for bread and cracker making, while soft wheat has lower protein and is more suited to cookies and cakes.

Wheat consists primarily of carbohydrate (85%), most is starch (80%) contained within granules in the endosperm. Starch functionality is an important baking quality tool that may be manipulated and measured by starch paste viscosity, gelatinization temperature and starch damage. Starch damage, which refers to physical damage to starch granules, has a significant effect on water absorption, which controls dough functionality. Native starch absorbs 0.4 times its weight of water whereas damaged starch absorbs 4 times its weight of water. High starch damage is desirable for bread making to increase moisture content and enhance enzyme activity for fermentation whereas low starch damage is needed for biscuit/cookie making because moisture must be removed in baking. Starch damage can be measured by susceptibility of starch granules to degradation by amylolytic enzymes because amylases cannot readily hydrolyze undamaged native starch granules. Starch gelatinization refers to chemical modification of starch involving breakdown of intermolecular bonds within starch molecules in the presence of heat and moisture. Gelatinized starch absorbs more water due to exposed hydrogen bonding sites. Lower levels of starch gelatinization are required for biscuits and cookies to produce lighter, shorter textures.

A whole grain flour is considered to be whole grain as long as all three original parts of the caryopsis—the bran, germ, and endosperm—are still present in the same proportions as when the grain was growing in the fields. The components may be in the form of intact, ground, cracked or flaked. A whole grain flour should also deliver the same rich balance of nutrients that are found in the original grain. This is the definition given by the FDA and (U.S. Food and Drug Administration) and AACCI (American Association of Cereal Chemists International) for foods to be labelled as whole grain. Refined white flour, by definition, is not whole grain because the outer germ and bran layers have been removed.

Products made with whole grain flour are recognized as being healthier than those made with refined flour as they contribute significant nutrients to the diet including carbohydrate, protein, iron, dietary fiber, iodine, magnesium, zinc, B-group vitamins (thiamin, folate, riboflavin and niacin) and vitamin E. Whole grains contain a number of phytonutrients including phenolics, flavonoids and anthocyanins that exhibit antioxidant activity as measured by several tests (TEAC, ORAC) and confer health benefits associated with prevention of chronic diseases such as cardiovascular disease, diabetes and cancer. However, many phytonutrient compounds contained in whole grains are inherently bitter, which has led to limited consumer acceptability of products made with whole grains.

SUMMARY

Embodiments herein relate to stabilized, whole-grain flour, food products including such stabilized, whole-grain flour, and methods of making stabilized, whole-grain flour and food products including the same. In an embodiment, a method of producing a whole grain flour includes heating whole grain to a temperature of about 120 degrees Celsius to about 160 degrees Celsius for about 5 to 20 minutes; milling the whole grain to form a bran and germ component and a break flour component; separating the bran and germ component from the break flour component to form a bran and germ fraction and a break flour fraction; fine milling at least a portion of the bran and germ fraction; and recombining the bran and germ fraction with the break flour fraction.

In an embodiment, a whole grain flour is included having a bran and germ component and a break flour component. The whole grain flour can exhibit one or more of a lipase activity of 1.5-1.7 μmol p-NPB/hr/0.1 g or less; a DSC enthalpy for starch of 0.34-0.67 J/g at a peak temperature of 63-73° C.; a total free phenolics content 1.19 g/kg or less; and free fatty acids content of less than 0.16 wt. %.

In an embodiment, a whole grain flour is included having a bran and germ component and a break flour component. The fresh whole grain flour can include at least one of furaneol content greater than 16 μg/kg, methional content greater than 7.5 μg/kg, 1-hexanol content less than 40 μg/kg and hexanal content less than 290 μg/kg.

In an embodiment, a whole grain farinaceous food product is included. The product flour, wherein at least about 80 wt. % of the total flour content comprises a flour according to an embodiment herein. The whole grain farinaceous food product can include at least one of phenylacetic acid greater than 1500 μg/kg and hexanal content less than 160 μg/kg.

BRIEF DESCRIPTION OF THE FIGURES

Aspects may be more completely understood in connection with the following drawings, in which.

Figure 1:
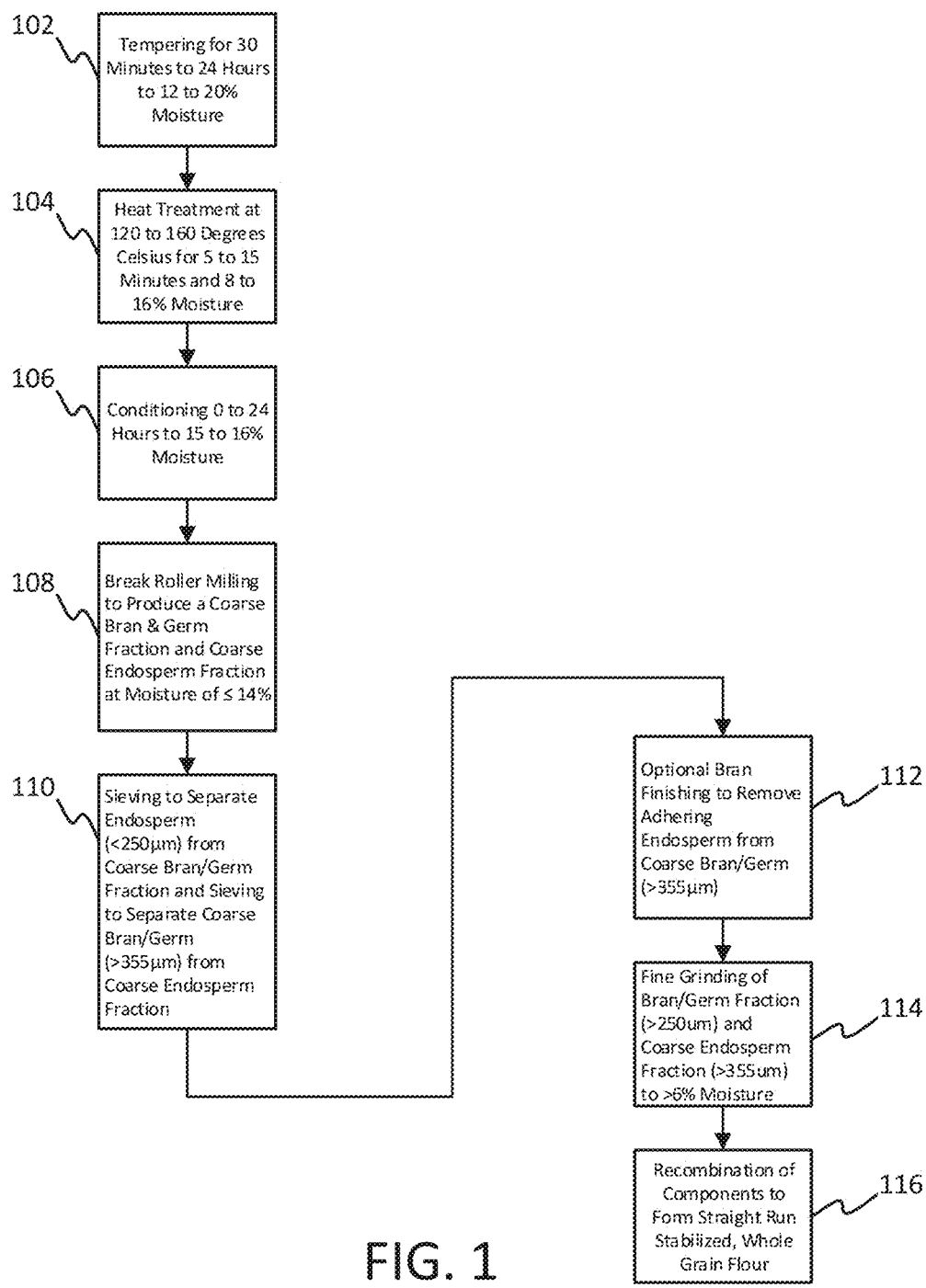
FIG. 1 is flowchart illustrating an exemplary process in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Whole grain foods are considered to be healthier than their non-whole grain counterparts because of their increased fiber content, increased vitamin content (including niacin, thiamin and folate), and increased mineral content (including zinc, iron, magnesium and manganese). As such, there is an ever-growing demand for whole grain flours and products made with whole grain flours.

However, the quality of baked whole grain products made with typical whole grain flours are characterized by some or all of the following negative sensory attributes: a wheaty/green and/or rancid flavor, low volume or stack height, dark color, dense/firm texture and gritty/astringent mouthfeel. As such, whole grain flour produces technologically inferior products to refined flour.

In addition, the shelf life of typical whole grain flour is significantly shorter than refined flour due to its predisposition to rancidity. This is due to lipid degrading enzymes—lipase and lipoxygenase contained in bran and germ respectively that hydrolyze triglycerides in wheat germ to free fatty acids then oxidize polyunsaturated forms to various peroxides. In addition, other lipid oxidation products, which are responsible for undesirable odors and flavors form when free fatty acids are exposed to lipoxygenase and oxygen. These reactions occur only once the grain is milled and initiates over a period of weeks and proceeds over several months.

To improve shelf life, the bran/germ component of whole grains can be 'stabilized' by heat treatment or methods to otherwise reduce lipolytic enzyme activity. If whole grain flours are not effectively stabilized, shelf life is limited even if stored under refrigeration. Fine grinding of bran/germ to reduce particle size and address the gritty texture can speed up lipolysis due to the enhanced diffusion of oil through flour and contact with enzymes. Conversely, more coarsely ground wholegrain flours increase the perception of grittiness. Heating bran/germ fractions can gelatinize starch and denature proteins causing adverse changes to starch functionality and gluten development, which interferes with the chemistry of normal dough formation processes, the mechanics of dough deformation processes during processing, and dough volume and spread changes during baking.

Wheat flavor in whole grain foods is determined by the content and composition of volatiles, phenolics, peptides, Maillard reaction products and lipids, which are mostly contained within the wheat bran and germ layer. The bran and germ fraction has been the focus of many attempts of making whole grain flour by either stabilizing the lipid degrading enzymes or using fine grinding techniques to approximate the particle size of flour. However, whole grain flours have had limited commercial success in baked applications as they have not addressed (in their entirety) a set of several complex competing priorities that must be resolved in order to optimize suitability for baking. These can include, but are not limited to, the following:

Reduction of negative (e.g., bitter phenolics) and enhancement of positive masking (e.g., brown-sweet Maillard reaction products) wheat flavor compounds Sufficient inactivation of lipid degrading enzymes for extended shelf life Limited, controlled amount of starch gelatinization and protein denaturation for baking functionality and product texture Limited starch damage to reduce water absorption during dough mixing Minimized bran moisture loss to reduce dryness Minimized bran darkening to reduce speckiness A specific bran particle size range to reduce grittiness and reduce rancidity.

As such, while increased use of whole grain flours is desired by many consumers, the drawbacks associated with whole grain flours have limited the degree of its use in the baking industries.

Whole meal and whole grain flours are typically manufactured by reconstituting refined white flour with the bran and germ components in the proportions found in the intact whole grain. The bran and germ component is usually stabilized after milling. However, embodiments herein are unique in that intact whole grains are stabilized before milling to significantly reduce the lipolytic enzyme load available to hydrolyze oil contained in germ before the enzyme is exposed to oil. This is advantageous as it allows flexibility in the production process as heat treatment does not need to be coupled with or time dependent on flour milling & fine grinding. It also potentially extends shelf life beyond that of typical commercial processes as the enzyme load is lower at milling, the point at which oxidative and hydrolytic rancidity begins. Unexpectedly, stabilizing whole grains also creates a limited, controlled level of starch gelatinization that is beneficial for cookie/cracker manufacturing as it improves texture and dissolvability. Dissolvability is an important quality attribute for whole grain products as it reduces the perception of denseness and toothpacking as well as grittiness as the food particles break down and clear the mouth rapidly when chewed.

In forming an improved, stabilized whole grain flour there are competing priorities. For example, a high temperature thermal process is needed to inactivate enzymes and volatilize bitter compounds, but a low temperature thermal process is needed to limit starch gelatinization (responsible for hard, glassy texture).

In addition, fine particle size is desired to reduce grittiness, but coarser particle size is desired to reduce physical starch damage and improve product volume and texture. In accordance with embodiments herein, particle size is reduced until grittiness is not detected to find the coarsest particle size possible. In addition, fine grinding is focused on the bran rather than endosperm because the bran is generally responsible for perceived grittiness whereas coarse flour (endosperm) is important for improving functionality of starch in dough and baking as there is more intact starch granules or less mechanically damaged starch. This counteracts the loss of a small amount of intact starch during heat treatment that becomes gelatinized. In addition, it has been found that grinding the bran/germ too fine (<150 µm) accelerates the rate of oil oxidation. As such, there is a chemical composition and particle size range optimum for bran and flour (endosperm) to address all these considerations.

Embodiments herein achieve a desired balance between these competing priorities. In specific, in accordance with various embodiments herein, the entire grain is subjected to a thermal processing step at a tightly controlled temperature which has been found to substantially inactivate lipase enzyme and improve flavor by reducing a range of volatile and non-volatile bitterness compounds (such as free phenolics and 1-hexanol) possibly by heat induced chemical conversions, volatilization and breaking down cell wall structures which are further degraded by milling or grinding and while the grain is still hot and losing heat as vapor essentially enhancing volatile removal. In addition, this process produces Maillard reaction and caramelization type flavors and yet does not result in substantial gelatinization of starch, which would reduce baking functionality of the flour as baking functionality requires a maximum amount of intact native starch granules to swell/gelatinize and absorb/release moisture at critical points during mixing and baking to ensure oven rise and hence product structure and texture However, there is a small amount of starch gelatinization incurred in the heat treatment process of intact whole grains in a precise, control manner as described herein.

That has produced an unexpectedly beneficial effect on baking functionality as gelatinization of a small proportion of the starch has been found to increase dissolvability in low moisture bakery products such as biscuits and crackers. Dissolvability is an important quality attribute for whole grain products as it reduces the perception of denseness and toothpacking as well as grittiness as the food particles break down and clear the mouth rapidly when chewed.

After thermal processing, a first gentle milling step is performed to reduce the level of mechanically damaged starch and retain more intact starch granules than conventional roller milling (used in most other commercial whole grain flours). This is achieved by utilizing corrugated break rolls only and producing a coarser endosperm fraction than that made from conventional milling that utilizes both break and reduction rolls. The lower level of mechanical starch damage in the present method offsets the small amount of gelatinized starch mentioned previously and improves baking functionality by allowing starch to function (swell and gelatinize) to a similar extent as starch does in products made from non-wholegrain flours, i.e., conventionally milled refined white flour. In this way, the present method produces similar stack height, dimensions and firmness in biscuits and crackers as that achieved using non-wholegrain flours.

In addition, after the thermal processing step and after a first gentle milling step producing a coarse flour, then the bran and germ can be separated from the endosperm and fine grinding can be performed on the released coarse germ and bran to a create a bran and germ particle size that is just below the grittiness perception threshold. By only fine grinding the bran and germ, damage to the endosperm that would reduce baking functionality can be avoided. After fine milling, the bran and germ can be recombined with the endosperm fraction in the original proportions in the whole grain to result in a stabilized, whole-grain flour.

The addition of a low-intermediate amount of moisture during tempering and its removal during heat treatment ensures that the moisture content of the grain does not go below a threshold value at which starch and protein are heated at a moisture content low enough for irreversible structural changes to occur to starch which significantly reduce baking quality. This moisture content threshold after heat treatment is generally around the moisture content at which the raw grain was at equilibrium in storage. In various embodiments, the moisture content threshold can be 10, 11, 12, 13, or 14 percent. Higher moisture content than the raw grain after heat treatment results in excessive starch gelatinization and protein denaturation. This also has a detrimental effect on baking quality, but less so than lower moisture content. Tempering whole grains within a tightly controlled time and temperature range has been found to prevent unwanted increases in lipase activity immediately prior to heat treatment.

As such, embodiments herein include stabilized, whole-grain flour, food products including such stabilized, whole-grain flour, and methods of making stabilized, whole-grain flour and food products including the same.

Types of Wheat

Various types of wheat can be used in processes herein to create stabilized, whole-grain flours. By way of example, wheat that can be used in processes herein can include, but is not limited to, hard red winter wheat, hard red spring wheat, soft red winter wheat, durum wheat, hard white wheat, and soft white wheat. In particular embodiments, hard white wheat and soft white wheat is used herein. Principle species of wheat can include *Triticum aestivum* or bread wheat and *T. durum* which has extra hard kernels used primarily for pasta products. However, other species are also contemplated herein. In various embodiments herein, the process described herein can also be applied to other cereals including, but not limited to, rye, triticale, barley, millet, sorghum, oats, rice, *quinoa*, buckwheat, amaranth, oilseeds and legumes. In some embodiments, the process described herein can be applied to sprouted grains.

Process

Tempering

Various embodiments herein can include an initial step of tempering. In some embodiments, the method can specifically include tempering the whole grain to increase the moisture content to account for the moisture loss during the subsequent heat treatment step. In some embodiments, the desired value for moisture content can be about 11, 12, 13, 14, 15, 16, 17, 18, 19, 20 or 21 percent by weight. In some embodiments, the desired value for moisture content can fall within a range wherein any of the preceding values for moisture content can serve as the upper or lower bound of the range. In some particular embodiments, the moisture content can be adjusted to be from about 12 to 20 wt. percent moisture. Preferably, the moisture content is raised by about 2-4% above the moisture content desired after heat treatment to limit the swelling of starch and prevent drying.

Tempering the grain can be performed in various ways and using various equipment. In some embodiments, grain can be loaded into a vessel with water and agitated to ensure homogenous hydration before being allowed to sit for a period of time. In some embodiments grain can be put into a continuous-flow mixer and water can be added at one or more points along the flow path of the grain through the mill. Exemplary machinery for tempering the grain can include, but is not limited to, the Baler Turbolizer or the Satake SHD Hydrator (commercially available from Satake Australia); a paddle screw conveyor with moisture addition; a dampener; or the like. The desired period of time for tempering can vary depending on the type of wheat being processed, ambient temperatures, and the like.

It is desirable to ensure that the majority of water penetration is confined to outer grain layers (i.e., bran/germ) by tightly controlling the duration of tempering. This is to focus heat conduction in these outer layers to reduce enzyme activity for stabilization and enhance removal of negative volatile compounds as water is a good conductor of heat. Also, to minimize conduction to inner grain layers (i.e., endosperm) to limit starch gelatinization and protein denaturation.

While not intending to be bound by theory, in some embodiments, adjusting the moisture content of the whole grain herein creates a heterogeneous moisture profile within the grain prior to the step of heating the whole grain. By way of example, in some embodiments, the moisture content can be higher (on average) in the bran/germ portions than in the endosperm portion. In some embodiments, the moisture content can be at least about 5, 10, 15, 20, 25, 30, 40, or 50 percent higher (on average) in the bran/germ portions than in the endosperm portions.

Typical wheat tempering processes for milling are generally 18-24 hours in duration, which would likely be unsuitable in this context. Also, tempering for more than 2 hours is not preferred as endogenous enzyme activity can be elevated. In some embodiments, the period of time can be from 1 minute to 18 hours or more. In some embodiments, the period of time can be from 1 minute to about 120 minutes. In some embodiments, the period of time can be from 75 minutes to about 105 minutes. In some embodiments, the period of time can be about 60 to 90 minutes.

In some embodiments, the input for the tempering step can be grains of wheat in a whole state. However, in other embodiments, some processing steps can be performed on the grains prior to the conditioning step, such as kibbling or rolling.

It has been found herein that tempering with water above ambient temperature or holding at temperatures above ambient are not preferred due to elevated endogenous enzyme activity. The use of steam to heat and add moisture simultaneously typically results in a greater than desired amount of moisture imparted to the grain if the steam is above atmospheric pressure. If a small amount of moisture is added via steam for tempering grain and the temperature of the grain remains at a low temperature (e.g., below 60° C.) then heat treatment can follow with steam injection turned off as heat treatment is a not a hydrothermal process but rather a 'dry' process to slightly reduce moisture content to a preferred level. However, depending on the design and scale of heat treatment equipment, some residual steam in the heat treatment chamber may be required to humidify the atmosphere to allow a controlled small reduction (2-3%) in moisture content. In various embodiments, the process is done in a staged manner either continuously or in batches including tempering followed by heat treatment. In a steam tempering scenario, the vapor penetration time for grain can be reduced. However, in some embodiments, ambient tempering with water as opposed to steam can be preferred.

Thermal Processing

Various embodiments herein can include a step of heating the whole grain wheat (or thermal processing) to stabilize enzyme activity and modify the flavor profile. The thermal processing step can be performed at various specific temperatures. In some embodiments, the temperature can be about 110, 120, 130, 140, 150, 160, 170, 180 or 190 degrees Celsius. In some embodiments, the temperature can fall within a range wherein any of the preceding temperatures can serve as the upper or lower bound of the range, provided that the upper bound is greater than the lower bound. In some embodiments, the temperature range can be from 120 degrees Celsius to 160 degrees Celsius.

The thermal processing step can be performed for various lengths of time. In some embodiments, the thermal processing step can be performed for 2, 3, 4, 5, 6, 7, 8, 9, 11, 13, 15, 17, 19, 25, 30, or 40 minutes. In some embodiments, the thermal processing step can be performed for an amount of time falling within a range wherein any of the preceding amounts of time can serve as the upper or lower bound of the range, provided that the upper bound is greater than the lower bound. In some embodiments, the amount of time can be from 5 to 15 or from 5 to 20 minutes.

The thermal processing step can be performed in various ways. In some embodiments, the thermal processing step is performed with or without steam at atmospheric pressure. In some embodiments, the thermal processing step is performed at ambient humidity. In some embodiments, the thermal processing step is performed using dehumidified air.

In some embodiments, grain can be put into a rotary drum heater (with or without convection currents) at the specified temperature. In some embodiments, the rotary drum heater can be closed (in contrast to a perforated drum or an open drum design) to ensure moisture loss is gradual & controlled (air flow can be somewhat restricted which maintains humidity and thus moisture drop is not excessive).

Rotary drum heaters or dryers can be of various sizes. In some embodiments, the rotary drum heater/dryer can include a rotating drum with a diameter of 10 cm to 4 meters and a length of 50 cm to 25 meters. The jacketed chamber walls can be heated by water, oil, steam or electrically. Humidified hot air or atmospheric steam can be blown through the drum as it rotates at velocities of 500 to 25,000 kg/m$^2$h or more to ensure homogenous heating of whole grain surfaces. However, other velocities are also contemplated herein. Exemplary rotary drum heaters/dryers can include, but are not limited to, those described in U.S. Pat. Nos. 2,971,265 and 3,852,892. It will be appreciated, however, that in some embodiments a non-rotary (static) heater/dryer can also be used. In some embodiments heating/drying can be performed as part of a batch process while in other embodiments it can be performed as part of a continuous process. In some embodiments, heating/drying can be performed as part of a continuous process using equipment such as a heated screw conveyor (Bepex Thermascrew or Solidaire Dryer) or cooker extruder.

The moisture content of the grain can be reduced during the thermal processing step. In some embodiments, heating the tempered whole grain wheat lowers the moisture content to between 8 and 17 percent. In some embodiments, heating the tempered whole grain wheat lowers the moisture content to between 15 and 17 percent. In some embodiments, heating the tempered whole grain wheat lowers the moisture content by not more than 3 moisture percentage points (wherein, for example, a change from 18 percent moisture to 15 percent moisture would represent a lowering of moisture content by 3 moisture percentage points). In some embodiments, heating the tempered whole grain wheat lowers the moisture content by not more than 2.5, 2.25, or 2 moisture percentage points.

However, in other embodiments, the moisture content of the grain can remain the same during the thermal processing step such as in the case of heating with steam without pressure.

When describing the heat treatment process, maintenance of the moisture content decrease of around 2% (or 1.8 to 2.2%) is a critical quality control parameter. In scale up of the process we have noted that water vapor in the form of atmospheric pressure steam must fill the atmosphere of the heating chamber/continuous pipework that the sample is held in or passes through to achieve an increase in humidity in order that the moisture content of whole grains does not drop by more than around 2% during the heat treatment process. The amount of steam to be added to achieve the desired moisture drop varies depending on the type/configuration and scale of the heat treatment equipment used—i.e. batch or continuous & void space volume. It also varies when scaling up from a benchtop batch configuration to a commercial scale configuration (batch vessels/continuous conveying screw equipment or continuous heated pipework equipment). This is due to the larger volume of void air in commercial scale equipment that is not humidified. Observations at a benchtop scale (i.e., heating in a small enclosed vessel without steam & whereby the humidity is created by evaporation of surface moisture from tempered wheat grains & maintained due to the small volume of void air in the benchtop batch system) here are only demonstrative of the key principles required to achieve the desired final quality in the wholegrain. It shall be understood there are a plurality of commercial configurations that are capable of achieving the same end point.

Further Conditioning

Optionally, in some embodiments, embodiments herein can include conditioning the whole grain to increase the moisture content after the thermal processing step. For example, in some embodiments the moisture content can be increased to about 15 to 17 percent moisture. In some embodiments, the moisture content of the grain is measured after the thermal processing step. If the moisture content is below the threshold amount for good milling separation, then a further conditioning step can be used to raise the moisture content up to a desired range of moisture content values. For example, in some embodiments, if the moisture content of the grain after the thermal processing step is less than 15, 14, 13, 12, 11, 10, 9, or 8 percent by weight, then a further conditioning step can be used to increase the moisture content, such as increase it until it is at least about 14 to 15 wt. percent.

Initial Milling

In various embodiments, an initial milling step can be performed on the whole grain product to form a coarse bran and germ fraction and a coarse break flour (endosperm) fraction. Preferably only minimal mechanical damage to starch is imparted to the endosperm fraction during this step. In some embodiments, the starch damage in the coarse endosperm fraction can be less than or equal to 5%, 4% or 3.5%. In some embodiments, a roller mill utilizing break rolls can be used to conduct the initial milling step. A roller mill generally includes a sequence of counter-rotating opposed fluted or corrugated break rollers that progressively slice and chop the wheat into smaller and smaller sizes and scrape endosperm from the outer bran layers. The rolls run at slightly different speeds to create a scratching effect to open up the grain and break off large flakes of bran and large chunks of endosperm, rather than a pressing or flattening effect. Output from each pair of rollers can be sorted into multiple streams, typically by means of rotary or vibratory sifters and purifiers, redressers or air classification, to separate the bran and germ from the endosperm and to direct coarser and finer fractions of the endosperm to appropriate rollers for further break milling and separating into finer and purer fractions.

In some particular embodiments herein, a roller mill with a series of at least 1 to 4 sequential fluted break rolls with a flute specification of 10-36 flutes/inch employing a 2-2.5:1 roll speed differential and 0.45/0.09/0.08 mm progressive roll gap settings in conjunction with sequential plansifters can be used to mill the whole grain forming the two different coarse fractions. In some embodiments, the roller mill can include 1 to 5 or 3 to 4 sequential fluted break rolls. Sieving the break flour from coarse bran and germ is preferably carried out using methods that prevent clogging of sieves, such as vibratory sifters arranged in sequence ranging in screen size from 1000 µm to 250 µm.

The break milling process is similar to the first stage of conventional roller milling. However, the difference lies in that other wholegrain flours are made from conventional refined flour milling process using both break and reduction roll processes. The process herein only utilizes the break roll portion of the milling process (e.g., reduction roller processes are omitted) with the advantage being that it produces a coarser flour (semolina) yielding less mechanical starch damage and therefore better baking properties as compared to wholegrain flour made from break & reduction milled flour. It will be appreciated other similar techniques may be used to separate the outer grain layers from endosperm with minimal mechanical damage to starch beyond using break roller milling without utilizing the reduction roll passage, such as but not exclusively, a wheat pearling process.

In some embodiments, the break flour or 'middlings' (predominately endosperm fraction) can be sifted and separated into a coarse predominantly bran fraction (particle size >355 µm) and a finer semolina fraction (particle size <355 µm). In some embodiments, the coarse fraction can be added to the coarse fraction of the coarse bran and germ fraction then ground finely to reduce the particle size thereof.

In some embodiments, the initial milling step can take place while the grain is still hot from heat treatment. It is believed that this can allow for a greater reduction in volatile compounds, such as volatile off-flavor compounds. In some embodiments, initial milling is performed while the grain is at least 40, 50, 60, 70, 80, or 90 degrees Celsius or at a temperature falling with a range between any of the foregoing. In some embodiments, initial milling is performed while the grain is at least 60 degrees Celsius. However, in other embodiments, initial milling can also be performed with the grain at ambient temperature.

Further Separation

In various embodiments, additional separate steps can be performed in order to get as complete as possible separation between the bran and germ fraction and the break flour (endosperm) fraction without incurring excessive starch damage. For example, in some embodiments a further step of separating out coarse endosperm particles (<250 µm) from the bran and germ fraction can be performed and then the recovered endosperm can be added to the break flour (endosperm) fraction. In some embodiments, a further step of separating out coarse bran and germ (>350 µm) from the break flour (endosperm) fraction can be performed and then the recovered bran and germ can be added to the coarse bran and germ fraction. Further separation steps such as these can be performed using various pieces of equipment or combinations of equipment such as sieves, sifters, plansifters, bran finishers and air classifiers or the like.

Fine Grinding

In various embodiments, a step of fine grinding can be performed. In particular, a step of fine grinding can be performed on the bran and germ fraction. Fine grinding can be performed in various ways and with various pieces of equipment. In various embodiments, fine grinding is performed to get the bran and germ fraction to an average particle size that is just below a grittiness perception threshold.

Prior to the fine grinding of the bran and germ fraction, the average size of bran and germ fraction particles can be about 20 wt. %>500 μm and 60 wt. %>850 μm. After fine grinding of the bran and germ fraction, the average size of particles therein can be about 46-87 wt. %<149 μm.

Finer bran particle size (i.e., <149 μm) is desirable for biscuit/cracker making to reduce the grittiness perception, but without impacting baking functionality. However, for bread making, it may be desired to limit the proportion of bran particles <149 μm as excessive small particles can interfere with gluten structure and cause loaf collapse. As such, the particle size distribution can be adjusted to suit the end product application by altering the bran/germ grinding settings. In some embodiments, where flour for cookies, biscuits and crackers is desired the finely ground bran and germ fraction can include from 46 to 87 wt. % particles that are <149 μm.

Cooling may be employed during fine grinding to reduce temperature increase due to mechanical friction and assist in mitigating moisture loss of bran. Low moisture bran has a drying effect on the end product and can heighten sensations of astringency and grittiness. Cooling can include cool or chilled air passed through the grinding chamber or cooling the coarse bran before grinding or both. Without cooling, temperature increase of the bran and germ fraction can be 10-15° C. higher than ambient conditions with associated moisture losses of up to 50%. Alternatively, coarse bran may be conditioned to a slightly higher moisture content to counteract moisture losses during fine grinding. However, there is an upper moisture content limit for conditioning coarse bran above which fine grinding throughput is reduced. In some embodiments, multiple steps of fine grinding can be performed utilizing successive passes or air classification to sort the particles by density that undergo successive fine grinding passes. In other embodiments, only a single step of fine grinding is performed.

In various embodiments, fine grinding the whole grain can be performed utilizing a gap, universal, pin or classifier mill. As a specific example, fine grinding can be performed using a Bauermeister Universal mill with Turbo rotor and 0.3-1 mm sieve perforation. In some embodiments, fine grinding can include a first step of processing with a hammer mill, a universal mill, a pin mill or a gap mill and a second step of processing with a gap mill.

Recombination

After fine grinding, the bran and germ fraction can then be recombined with the break flour (endosperm) fraction (<355 μm) and bran/germ fraction (<250 μm) to produce a finished, stabilized, whole grain flour, which can be a straight run flour (i.e. all flour streams from the process are combined).

In some embodiments, stabilized, whole grain flours herein can be sold or used as 100% whole-grain flours. However, in other embodiments, it may be desired to add a small fraction of a refined flour, such as prior to using the flour to create a baked product such as a biscuit or the like. As such, in some embodiments, methods herein can include a step of adding a refined white flour to the stable, whole grain flour. The amount of refined white flour can vary based on the desired end product or desired functional features. In some embodiments, an amount of refined flour is added such that about 1, 5, 10, 15, 20, 25, 30, 35, 40 or 50 wt. percent (or an amount falling within a range between any of the foregoing) of resulting flour combination (stabilized, whole wheat flour plus refined flour) is refined flour with the balance of flour being a stabilized, whole wheat flour such as that described herein. This refined flour could also be added as part of the formulation to dilute the whole grain flour proportion as required for desired baking properties.

It will be appreciated that in various embodiments additional steps beyond those described above can also be performed. Further, in various embodiments, only a subset of those steps described above are performed.

Referring now to FIG. 1, a schematic flowchart is shown of an exemplary process in accordance with various embodiments herein. The process can include tempering whole wheat grains (102) for 30 minutes to 24 hours to reach a moisture content of 12 to 20 percent by weight. It has been found that adding moisture at this stage assists with elimination of volatile and non-volatile bitterants and optimizes starch gelatinization and thus baking functionality.

The process can also include a heat treatment step (104) at 120 to 160 degrees Celsius or 120 to 180 degrees Celsius for 5 to 15 minutes or 5 to 20 minutes to reach a final moisture content of 8 to 16 percent. It has been found that heating above 120 degrees Celsius substantially inactivates enzymes (such as lipases) and that heat treatment of the moisture-treated grain volatilizes and reduces bitterants in the bran and germ as well as producing an optimal, low amount of gelatinized starch.

The process can also include an optional further conditioning step (106) for 0 to 24 hours in order to result in a moisture content of approximately 15 to 16 percent by weight. This step conditions the wheat to result in an optimum moisture content for physical separation processes to ensure efficient and gentle separation of bran from endosperm.

The process can also include a break roller milling step (108) to produce a coarse bran & germ fraction and coarse endosperm fraction with low starch damage and reduce moisture to 14% or less by weight.

The process can also include a sieving (or separation) step (110) to separate a break flour portion (with particles of predominantly less than 250 μm) from coarse bran/germ (with particles of predominantly greater than 250 μm). Sieving can also include separating coarse bran/germ (with particles of predominantly greater than 355 μm) from the coarse endosperm fraction (with particles of predominately less than 355 μm). This step achieves separation of the endosperm fraction from the bran without significant further size reduction of flour particles to reduce starch damage.

The process can also include an optional step (112) of bran finishing to remove adhering endosperm from the coarse (>355 μm) bran/germ.

The process can also include a fine grinding step (114) of the bran or germ fraction (e.g., having, predominantly, particles greater than 250 μm) and the endosperm fraction (having, predominately, particles greater than 355 μm). This can be done using various pieces of equipment including, but not limited to, a hammer mill, universal mill, gap mill, pin mill or the like. This step can produce a mixture of particles having a very limited amount of particles above 500 μm, and/or 250 μm, in size. This step reduces the size of particles of bran/germ and functions to reduce sensory perception of grittiness and dryness. Cooling may also be employed to reduce heat generated during fine grinding and limit moisture loss. Large particles of bran and germ with low moisture content can have an increased perception of roughness or dryness in the mouth or throat which is undesirable. This step can result in moisture reduced to 14% or less but greater than 6%.

The process can also include a step of recombination (116) of the fine ground bran and germ with the endosperm (or break flour) (<355 µm) fraction and bran/germ fraction (<250 µm). This step can create a single, stabilized, 100% whole grain straight run flour with improved flavor. The same flour has functionality that produces optimized texture and improved flavor and shelf life in end products.

Flour Parameters

In various embodiments herein, the whole grain flour is stabilized to prevent development of rancidity. Stabilized whole grain flours exhibit a desirable level of stability when stored after their production. Stability can be assessed by a number of measures, although the key measures used herein involve measuring lipase and free fatty acids. Lipase is contained mostly within bran layer and catalyzes lipid degradation of unstable germ oils to free fatty acids. This reaction only occurs once the intact cell structures in sound, unsprouted grain are broken down by physical processes such as milling or grinding. Lipase is monitored because it is also an indicator of lipoxygenase activity, which is present mostly in the germ and responsible for oxidizing free fatty acids in the presence of oxygen to rancid breakdown products such as peroxides and aldehydes. Moisture accelerates the reaction and while moisture levels found in wholegrain flour are low, they are high enough to cause significant changes over weeks to months of storage depending on storage conditions. In addition, the water added during dough mixing increases the lipid degrading enzyme reaction time to minutes. Thus, whole grain flours and their products are very susceptible to rancidity as caused by hydrolytic and oxidative processes from the high bran and germ content as compared to refined white flour where it is of little concern.

In various embodiments herein, the stabilized whole grain flour has a shelf life of greater than 30, 40, 50, 60, 75, 90, 120 or 180 days (or a shelf life falling within a range between any of the foregoing) under controlled ambient storage conditions. In some embodiments, the stabilized whole grain flour has a shelf-life that falls within a range wherein any of the preceding lengths of time can serve as the upper or lower bound of the range provide that the upper bound is greater than the lower bound. In some embodiments, shelf life can be the amount of time that it takes the flour to reach a particular threshold value of free fatty acid content. In some embodiments, the stabilized whole grain flour has at least a 30, 40, 50, 60, 70, 80, 90, 95, or 98% reduction (or an amount falling within a range between any of the forgoing) in free fatty acid content (as measured by weight) compared with an unstabilized whole grain flour equivalent (e.g., otherwise identical whole grain flour that is not stabilized) after accelerated shelf life storage at 35° C. for 1 month. In a particular embodiment, the stabilized whole grain flour achieved >50% reduction in free fatty acid content compared to an unstabilized whole grain flour equivalent after accelerated shelf life storage at 35° C. for 1 month.

In various embodiments herein, the stabilized, whole grain flour can exhibit desirably low levels of lipase activity. Lipase is an enzyme that catalyzes the hydrolysis of fats resulting in the production of free fatty acids which are associated with various off-flavors. In various embodiments herein, the stable, whole grain flour herein can have a lipase activity that is at least 30%, 40%, 50%, 60%, 70%, 80%, 90%, or even 95% less (or an amount falling with a range between any of the foregoing) than an unstabilized whole grain flour equivalent (such as an otherwise identical unstabilized whole grain flour). The term "unstabilized" as used herein refers to whole grains or a whole grain flour not exposed to a heating step to inactivate enzymes. In various embodiments, herein, the stabilized, whole grain flour herein can have a lipase activity that is less than about 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, or 0.5 µmol p-NPB/hr/0.1 g. In various embodiments herein, the stabilized, whole grain flour herein can have a lipase activity that falls within a range wherein the upper or lower bound of the range can be any of the preceding activity amounts provided that the upper bound is greater than the lower bound. In some particular embodiments, the lipase activity can be from 1.5 to 1.7 µmol p-NPB/hr/0.1 g as compared to an otherwise identical untreated whole wheat with lipase activity from 2.9 to 3.1 µmol p-NPB/hr/0.1 g.

Phenolics content in the whole grain flour can result in perceived bitterness. In various embodiments herein, the stabilized, whole grain flour can include a concentration of phenolics that is less than otherwise identical unstabilized whole grain flour. In some embodiments, the phenolics content of stabilized, whole grain flour herein can be less than 99, 98, 97, 96, 95, 90, 85, 80, 75, 72, 70, 65, 60, or 50% (by weight) of the amount in an unstabilized whole grain flour equivalent (such as an otherwise identical unstabilized whole grain flour). In some embodiments, the total free phenolics content can be about 0.4, 0.5, 0.6, 0.7, 0.8, 0.9, 1.0, 1.1, 1.2, 1.3, 1.4 or 1.5 g/kg. In some embodiments, the total free phenolics content can fall within a range wherein any of the preceding amounts of free phenolics can serve as the upper or lower bound of the range, provided that the upper bound is greater than the lower bound. In some embodiments, the total free phenolics content of the stabilized, whole grain flour is from 0.88 to 1.19 g/kg.

Compounds such as 1-hexanol in the whole grain flour can result in a perceived off flavor. In various embodiments herein, the stabilized, whole grain flour can include a concentration of 1-hexanol that is less than otherwise identical unstabilized whole grain flour. In some embodiments, the 1-hexanol content of stabilized, whole grain flour herein can be less than 99, 98, 97, 96, 95, 90, 85, 80, 75, 72, 70, 65, 60, 50, 45, 40, 35, 30, 25, 20, 15, 12 or 10% (by weight) of the amount in an unstabilized whole grain flour equivalent (such as an otherwise identical unstabilized whole grain flour). In some embodiments, the total 1-hexanol content of the stabilized, whole grain flour is 12 to 49% (by weight) of an otherwise identical unstabilized whole grain flour. In some embodiments, the concentration of 1-hexanol in stabilized, whole grain flours herein is less than 0.1, 0.09, 0.08, 0.07, 0.06, 0.05, 0.04, or 0.03 mg/kg, or an amount falling within a range between any of the foregoing.

Hexanal can also result in a perceived off flavor. In some various embodiments herein, the stabilized, whole grain flour can include a concentration of hexanal that is less than otherwise identical unstabilized whole grain flour. In some embodiments, the hexanal content of stabilized, whole grain flour herein can be less than 600, 550, 500, 450, 400, 350, or 300 µg/kg (or can have a hexanal content falling within a range between any of the foregoing). In some embodiments, hexanal can be decreased by at least about 10, 30, 50, 80, 100, 150, 200, or 300 percent compared with an otherwise identical unstabilized whole grain flour.

Methional is a Maillard reaction product and can provide positive flavor notes. In various embodiments herein, the stabilized, whole grain flour can include a concentration of methional that is greater than an otherwise identical unstabilized whole grain flour. In some embodiments the methional content of stabilized, whole grain flour herein can be greater than 3, 3.5, 4, 4.5, 5, 5.5, 6, 6.5, 7, 7.5, or 8 µg/kg (or can have a methional content falling within a range between any of the foregoing). In some embodiments, Maillard reaction products, such as methional can be increased by at least about 10, 30, 50, 80, 100, 150, 200, 300, 400, or 500 percent compared with an otherwise identical unstabilized whole grain flour.

Furaneol can provide positive flavor notes. In various embodiments herein, the stabilized, whole grain flour can include a concentration of furaneol that is greater than an otherwise identical unstabilized whole grain flour. In some embodiments the furaneol content of stabilized, whole grain flour herein can be greater than 10, 11, 12, 13, 14, 15, or 16 µg/kg (or can have a furaneol content falling within a range between any of the foregoing). In some embodiments, furaneol can be increased by at least about 10, 30, 50, 80, 100, 150, or 200 percent compared with an otherwise identical unstabilized whole grain flour.

Phenylacetic acid can provide positive sweet flavor notes. In various embodiments herein, the stabilized, end products made with whole grain flour can include a concentration of phenylacetic acid that is greater than an otherwise identical end product made with unstabilized whole grain flour. In some embodiments the phenylacetic acid content of products made with stabilized, whole grain flour herein can be greater than 1000, 1100, 1200, 1300, 1400 or 1500 µg/kg (or can have a phenylacetic acid content falling within a range between any of the foregoing). In some embodiments, phenylacetic acid can be increased by at least about 190, 200, 210, 220, 230, 240, or 250 percent in an end product made from whole grain flour compared with an otherwise identical end product made from unstabilized whole grain flour.

DSC (differential scanning calorimetry) enthalpy of starch gelatinization can be used to identify phase changes of the material which, in this case, can allow for an assessment of degree of gelatinization of the starch in the whole grain flour. In various embodiments herein, the DSC enthalpy of starch in whole grain flour can be less than otherwise identical unstabilized whole grain flour but less difference in enthalpy is desirable. By way of example, in some embodiments DSC enthalpy of starch can be 95, 92, 90, 88, 86, 84, 82, 80, 75, 70, 65, or 60% of otherwise identical unstabilized whole grain flour. In some embodiments herein, the DSC enthalpy can be about 0.34, 0.52, 0.54, 0.56, 0.58, 0.6, 0.62, 0.64, 0.66, 0.68, 0.7, 0.72, 0.74, 0.76, 0.78, or 0.80 J/g. In some embodiments, the DSC enthalpy of the stabilized whole grain flour herein can fall within a range wherein any of the preceding values can serve as the upper or lower bound of the range, provided that the upper bound is greater than the lower bound.

In various embodiments herein, heat labile vitamin content can be equivalent to otherwise identical unstabilized whole grain flour. By way of example, in some embodiments, content of B group vitamins and vitamin E can be equivalent to otherwise identical unstabilized whole grain flour.

The overall particle size distribution of the overall stabilized whole grain flour can vary. Generally, bran/germ particle sizes greater than 500 µm are perceived as gritty. Particle sizes greater than 250 µm can be perceived as slightly gritty. However, fine particle size (<149 µm) increases the rate & extent of oxidative rancidity (increase in free fatty acid content during storage) and increases the extent of starch damage of residual flour contained in the bran/germ fraction, which are undesirable properties from a quality perspective. Unfortunately, attempts to decrease particle size with multiple grinding passes without any size or density-based classification reduces biscuit stack height and produces harder texture. However, in accordance with various embodiments herein, fine grinding is preferentially performed on the coarse bran and germ >250 µm fraction and break flour >355 µm fractions only.

The particle size distribution for the combined end-product whole-grain flour consistent with various embodiments herein can be as shown below in Table 1. Particle size distribution can be determined in accordance with standard procedures such as that for use with a Tyler RoTap electric testing sieve shaker (commercially available from Fisher Scientific).

TABLE 1

| Particle Size | Percent by Weight of All Flour Components |
|---|---|
| >500 µm | 0-4% |
| >250 µm | 15-30% |
| >149 µm | 35-60% |
| <149 µm | 15-40% |

In some embodiments, the percent by weight of all flour components with a particle size of greater than 500 µm is less than 5, 4, 3, 2, 1, 0.5, or 0.25 percent (or an amount falling within a range between any of the foregoing).

The particle size distribution for the bran and germ fraction consistent with various embodiments herein can be as shown below in Table 2.

TABLE 2

| Particle Size | Percent by Weight of Coarse Bran and Germ Fraction Before Fine Grinding | Percent by Weight of Bran and Germ Fraction After Fine Grinding |
|---|---|---|
| >850 µm | 60-65% | 0% |
| >500 µm | 20-25% | 0-4% |
| >250 µm | 1-5% | 3-33% |
| >149 µm | 10-15% | 10-17% |
| <149 µm | 0-1% | 46-87% |

The particle size distribution for the endosperm fraction consistent with various embodiments herein can be as shown below in Table 3.

TABLE 3

| Particle Size | Percent by Weight of Endosperm Fraction Before Sieving | Percent by Weight of Endosperm Fraction After Sieving |
|---|---|---|
| >500 µm | 2-3% | 0% |
| >355 µm | 15-20% | 0% |
| >250 µm | 15-20% | 20-25% |
| >149 µm | 35-60% | 40-70% |
| <149 µm | 5-25% | 10-30% |

The total starch content can be used as an indicator of the level of endosperm contamination in the bran/germ fraction before and after size separation. Ash content can be used as an indicator of bran/germ contamination in the endosperm fraction before and after size separation. Ash content can be measured in accordance with the method of AACCI 08-01.

Measurements of starch content (% by weight as measured per AACCI 76-13.01), starch damage (% as measured per AACCI 76-31.01) and ash content (% by weight as measured per AACCI 08-01) for components at various steps in processes herein are shown below in Table 4.

TABLE 4

|  | Starch content (%) | Starch Damage (%) | Ash content (%) |
| --- | --- | --- | --- |
| Coarse Bran/Germ before sieving | 15.8 | 6.2 | 4.9 |
| Coarse Bran/Germ after sieving > 250 μm | 12.3 |  | 5.2 |
| Bran/Germ after sieving < 250 μm | 58.7 |  | 1.6 |
| Coarse Endosperm before sieving | 64.5 | 3.4 | 0.8 |
| Coarse Endosperm after sieving > 355 μm | 61.4 |  | 1.2 |
| Endosperm after sieving < 355 μm | 67.4 |  | 0.55 |

The low level of flour contamination (measured as starch) in the Coarse Bran/Germ >250 μm fraction after break milling and sieving is optimal to reduce mechanical damage to starch during subsequent fine grinding. The Coarse Endosperm >355 μm fraction requires further separation based on density and particle size to achieve better separation of bran/germ from endosperm prior to fine grinding.

Food Products

Stabilized, whole grain flours herein can be used to make many different types of food products. By way of example, stabilized, whole grain flours herein can be used to make many different types of farinaceous products, including but not limited to, baked products. Farinaceous products herein can include, but are not limited to biscuits, breads, bagels, bread rolls, buns, flatbreads, tortillas, extruded snacks, pasta, noodles, pancakes, muffins, brownies, cakes, casseroles, cookies, crackers, pastry products, pies, pizzas, tarts, and the like. In particular embodiments herein, the farinaceous whole grain product is a biscuit/cookie, a cracker or a bread product.

In some embodiments, a whole grain biscuit or cracker is included with quality comparable to a non-whole grain biscuit, wherein at least about 50 wt. % of the total flour content comprises a stable, whole grain flour in accordance with embodiments herein. In some embodiments, at least 60, 70, 80, 85, 90, 92, 94, 96, 98, 99, or 100 wt. % of the total flour content can be a stable, whole grain flour in accordance with embodiments herein. In some embodiments, the percentage of the total flour content of the baked item that is a stable, whole grain flour as described herein can fall within a range wherein the upper and lower bound can be any of the preceding percentages provided that the upper bound is greater than the lower bound.

EXAMPLES

Example 1: Thermal Effect on Stabilization (Lipase) and Starch Functionality (RVA)

Starch Functionality in whole grain flour samples was measured using a Rapid Visco Analyzer (RVA) using standard method AACCI 76-21 "General Pasting Method for Wheat or Rye Flour or Starch Using the Rapid Visco Analyzer".

Figure 2:
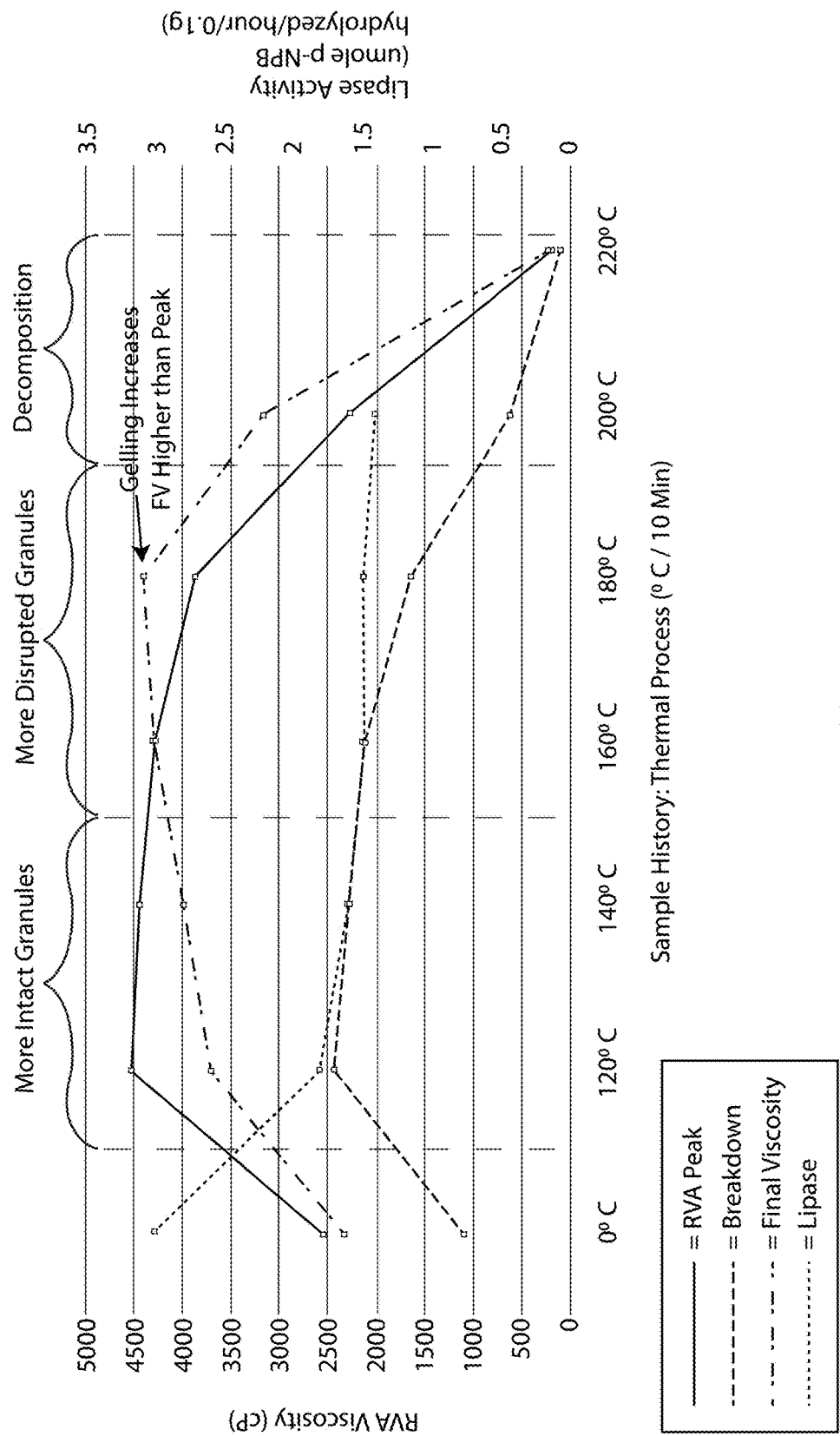
FIG. 2 is chart showing RVA viscosity and lipase activity as a function of processing temperature as evaluated in Example 1 herein.

The results are shown in FIG. 2 for samples with no tempering. As can be seen, from 120 to 140 degrees Celsius there is mostly swollen intact starch granules from heat treatment & less gelatinized disrupted starch. This is evidenced by the increase in viscosity relative to raw starch. Intact starch gives better biscuit making performance as it is able to swell during mixing assisting with dough forming and gelatinize during baking assisting with product rise in the oven as measured by good stack height and light textures.

At 180 to 200 degrees Celsius there is mostly gelatinized starch and less swollen starch. This is less desirable for biscuit making giving denser textures & lower stack height). This data shows that approximately 140° C./10 min is the best compromise between starch functionality & stabilization.

Example 2: Baking Functionality as Assessed by DSC Analysis Varying Temperature of Heat Treatment The gelatinization profile of starch in wholegrain samples was determined as an estimate of baking functionality using differential scanning calorimetry. Phase transitions were also monitored simultaneously using thermogravimetric analysis (TGA).

The instrument used was a Simultaneous DSC-TGA Netzsch 449C Jupiter with Netzsch Proteus software. Aluminum sample pans with pierced lid were used. Whole grain wheat samples were ground on a hammer mill with 0.5 mm screen then mixed with water (1:1), covered and rested for 30 minutes to equilibrate then weighed (35-45 g) in duplicate into sample pans. The DSC baseline was initially created over a temperature range of 30 to 200° C. with a heating rate of 10K/min using two empty sample pans to determine the baseline slope and offset. To calculate the enthalpy of ungelatinized starch the total heat flow curve was integrated from 60-78° C. Gelatinisation onset occurred at around 60-66° C., endothermic peak of gelatinization occurred around 69-71° C. and the endpoint of gelatinization was at 74-75° C. Starch enthalpies for the raw, unstabilized whole grain sample were 0.72 J/g and for stabilized whole grain sample ranged from 0.13-0.64 J/g, depending on the stabilization method used. The starch enthalpy for the preferred process sample (52K) was reduced by only 11% from an equivalent unstabilized whole grain sample (sample 44K). This is indicative of the relative degree of starch gelatinization between the control and stabilized sample and hence the expected level of difference in baking functionality.

TABLE 5

| Sample Information | | | | Total water in | | |
| --- | --- | --- | --- | --- | --- | --- |
| Name | Heat treatment | Tempering % Added Moisture | % Moisture content | starting sample after 50% water added | Sample Mass (mg) | Heat Rate (K/min) |
| 44K | none | 0 | 10.08 | 55.00% | 38.24 | 10 |
| 48K | 140 C./10 min 350 g | 0 | 9.55 | 54.80% | 42.48 | 10 |

TABLE 5-continued

| | Sample Information | | | Total water in | | |
|---|---|---|---|---|---|---|
| Name | Heat treatment | Tempering % Added Moisture | % Moisture content | starting sample after 50% water added | Sample Mass (mg) | Heat Rate (K/min) |
| 56K | 180 C./10 min 350 g | 0 | 8.04 | 54.00% | 33.71 | 10 |

The results are shown in Table 6 below:

TABLE 6

| | DSC Results | | | | | TGA Results | |
|---|---|---|---|---|---|---|---|
| | small endo peak (starch) | | large endo peak (water) | | | | |
| Sample | Onset Temp (° C.) | Enthalpy (J/g) | Onset Temp (° C.) | Peak Temp (° C.) | Enthalpy (J/g) | Enthalpy (J/g) | Onset Temp (° C.) | Mass Loss (%) |
| 44K | 66.9 | −0.7218 | 107.2 | 138.7 | −1013 | −1177 | 106.9 | 51.99 |
| 48K | 67.9 | −0.1333 | 109.8 | 142.3 | −1048 | −1115 | 108.3 | 50.52 |
| 56K | 66.4 | −0.03948 | 104 | 143.6 | −757.6 | −980.7 | 105 | 49.91 |

This example shows that higher temperatures (e.g., 180 degrees Celsius) resulted in substantial reductions in enthalpy reflecting greater starch gelatinization, reduced starch functionality, and reduced baking functionality.

Example 3: Baking Functionality as Assessed by DSC Analysis Varying Moisture Content of Heat Treatment Samples were prepared with varying amounts of added moisture. DSC analysis was performed as described above.

TABLE 7

| | Sample Information | | | Total water in | | |
|---|---|---|---|---|---|---|
| Name | Heat treatment | Tempering % Added Moisture | % Moisture content | starting sample after 50% water added | Sample Mass (mg) | Heat Rate (K/min) |
| 44K | none | 0 | 10.08 | 55.00% | 38.24 | 10 |
| 48K | 140 C./10 min 350 g | 0 | 9.55 | 54.80% | 42.48 | 10 |
| 52K | 140 C./10 min 350 g | 9-10 | 12.66 | 56.30% | 33.82 | 10 |
| 54K | 140 C./10 min 350 g | 18-20 | 13.66 | 56.80% | 40.85 | 10 |

The results are shown in Table 8 below:

TABLE 8

| | DSC Results | | | | | TGA Results | |
|---|---|---|---|---|---|---|---|
| | small endo peak (starch) | | large endo peak (water) | | | | |
| Sample | Onset Temp (° C.) | Enthalpy (J/g) | Onset Temp (° C.) | Peak Temp (° C.) | Enthalpy (J/g) | Enthalpy (J/g) | Onset Temp (° C.) | Mass Loss (%) |
| 44K | 66.9 | −0.7218 | 107.2 | 138.7 | −1013 | −1177 | 106.9 | 51.99 |
| 48K | 67.9 | −0.1333 | 109.8 | 142.3 | −1048 | −1115 | 108.3 | 50.52 |
| 52K | 66.6 | −0.6361 | 107.8 | 138.5 | −990.9 | −1169 | 108.8 | 52.87 |
| 54K | 66.8 | −0.5675 | 106.9 | 150.6 | −1123 | −1215 | 109.9 | 53.97 |

This example shows that a small amount of added moisture (around 9-10% on weight basis) helps maintain native starch enthalpy reflecting reduced starch gelatinization, increased starch functionality, and increased baking functionality. Higher moisture addition (around 18-20% on weight basis) results in lower enthalpy than smaller moisture addition (around 9-10% added moisture) possibly as a result of increased starch gelatinization that occurs once increased water causes slight changes in amorphous starch structure, swelling and eventually starch granule disruption. Adding no moisture results in the largest starch enthalpy loss of all moisture treatments, which is reflected in poor baking quality.

Example 4: Reduction in Lipase Activity and Free Fatty Acid Content as a Result of Heat Treatment Lipase Activity was measured according to the method of Zhou, N. et al., "A simple assay for lipase activity in wheat flour streams. See World Grains Summit: Foods & Beverages Sep. 17-20 2006 San Francisco, Calif. USA. In specific, the procedure included the following steps:

1. Weigh samples (for wheat: flour—0.05 g, bran and germ—0.02 g). Add 9 ml phosphate buffer (pH7.5).
2. Add 1 ml of 10 mM p-NPB. Record the exact time of p-NPB addition. (The final concentration of p-NPB is 1 mM in the sample solution.)
3. Shake the sample tube, leave it in 25° C. water bath.
4. Centrifuge the sample at 1000 g for 5 min, 20 min after p-NPB addition.
5. Measure the supernatant absorbance at 400 nm at exactly 30 min after p-NPB addition.
6. Use phosphate buffer (9 ml) and p-NPB (1 ml) mixture as blank, leave the blank in 25° C. water bath for 20 min, centrifuge, and measure the absorbance at 30 min at 400 nm.
7. Calculate the sample absorbance by subtracting the blank absorbance from it.
8. Calculate the lipase activity: μmole p-NPB hydrolysed=(A−0.0555)/1380. Lipase activity is expressed as μmole p-NPB hydrolysed/hour/0.1 g Free Fatty Acid content in whole grain wheat flours was measured (as oleic acid) according to AACC International Approved Methods of Analysis, 11th Ed. Method 58-15.01. Determination of Free Fatty Acids. AACC International, St. Paul, Minn., U.S.A. http://dx.doi.org/10.1094/AACCInt-Method-58-15.01

TABLE 9

(Lipase)

| μ · mol p-NPB/hr/0.1 g | Control (Untreated Whole Grain Flour) | Stabilized, Whole grain Flour made from Stabilized Whole Grains | Stabilized, Whole grain Flour made from Stabilized Bran/Germ Concentrate |
|---|---|---|---|
| Raw Refined White Flour | 1.9 | | 1.9 |
| Raw Bran/Germ | 5.8 | | |
| Heat Treated Flour | | 1.5 | |
| Heat Treated Bran/Germ (140° C./10 min as whole grain) | | 2.1 | |
| Heat Treated Bran/Germ (100° C./5 min as coarse bran) | | | 1.9 |
| TOTAL | 2.9 | 1.7 | 1.9 |
| % Reduction | | 41% | 35% |

TABLE 10

(Free Fatty Acids - Day 0)

| % | Control (Untreated Whole Grain Flour) | Stabilized, Whole grain Flour made from Stabilized Whole Grains | Stabilized, Whole grain Flour made from Stabilized Bran/Germ Concentrate |
|---|---|---|---|
| Raw Refined White Flour | 0.11 | | 0.11 |
| Raw Bran/Germ | 0.44 | | |
| Heat Treated Flour | | 0.08 | |
| Heat Treated Bran/Germ (140° C./10 min as whole grain) | | 0.19 | |
| Heat Treated Bran/Germ (100° C./5 min as coarse bran) | | | 0.17 |
| TOTAL | 0.19 | 0.11 | 0.122 |
| % Reduction | | 44.10% | 35.80% |

TABLE 11

(Free Fatty Acids - 1 Month Accelerated Storage @ 35° C./75% RH)

| % | Control (Untreated Whole Grain Flour) | Stabilized, Whole grain Flour made from Stabilized Whole Grains | Stabilized, Whole grain Flour made from Stabilized Bran/Germ Concentrate |
|---|---|---|---|
| Raw Refined White Flour | 0.13 | | 0.13 |
| Raw Bran/Germ | 1.36 | | |
| Heat Treated Flour | | 0.08 | |
| Heat Treated Bran/Germ (140° C./10 min as whole grain) | | 0.4 | |
| Heat Treated Bran/Germ (100° C./5 min as coarse bran) | | | 0.37 |
| TOTAL | 0.44 | 0.16 | 0.18 |
| % Reduction | | 63.60% | 59.60% |

This example shows that methods herein produce stabilized whole grain flour from stabilized whole grains can be used to substantially reduce lipase activity and, therefore, reduce free fatty acid production over time thereby producing a whole grain flour with greater stability and longer shelf-life than a comparable unstabilized whole grain flour. Shelf life that is comparable or slightly improved can be achieved with stabilized whole grains compared to stabilized whole grain flour made from stabilized bran/germ concentrate.

Example 5A: Reduction of Volatiles as a Result of Heat Treatment and Fine Grinding Whole wheat samples (unstabilized or heat treated), milled either hot or under ambient conditions and stored fresh (frozen) or under accelerated storage conditions (35° C. for 1 month) were analyzed for volatiles content as a measure of wheat flavor. Wheat flavor is determined by the content and composition of volatiles, phenolics, peptides, Maillard reaction products and lipids, which are mostly contained within the wheat bran and germ layer.

Method:
Volatiles were extracted with Solid Phase Microextraction (SPME) for a semi-quantitative analysis. One gram of flour was weighed into a 10 mL headspace vial for extraction. The headspace was equilibrated for 5 minutes and then was sampled by SPME (solid phase microextraction) using a 50/30 µm CAR/DVB/PDMS fiber (1 cm fiber), exposed for 40 min. Temperature of extraction was set at 50° C. The fiber was then desorbed in the GC inlet port at 250° C. for 90 s, and flushed with Helium (10.6 ml/min) towards a 600 m×0.32 mm×0.5 µm capillary ZB Wax Column. The GC oven was programmed at 40° C. for eight minutes and then ramped to 160° C. at a rate of 4° C./minute and then to 240° C. at a rate of 7° C./minute with a final hold time of five minutes. Volatiles were analyzed with the use of a Shimadzu GCMS QP-2010 Ultra quadrupole mass spectrometer in positive mode. Scan was programmed for TIC and included masses 33-500 amu. Tentative identification was performed by comparison with a NIST 11 library database.

Data Analysis:

Chromatograms were automatically integrated and peaks identified using the default software settings. The larger peaks were aligned and compounds identified that were selected of interest. For some samples, certain compound peaks were missing, so the chromatograms were manually integrated and the peak area recorded for these compounds. Samples were run in triplicate and the mean average for each compound peak was taken. Data was normalised (all peak areas summed), and concentration calculated for each compound as follows: The peak areas for 1-Hexanol and 1-Pentanol were determined quantitatively by spiking samples with a known concentration of each analyte. All other volatile flavor compounds were determined semi-quantitatively based on comparison to the 1-Hexanol spike.

Results:

A selection of key samples and volatile compounds are identified in Tables 12 and 13.

TABLE 12

Concentration of Volatile Compounds Identified in Raw and Heat Treated Whole Wheat Samples (mg/kg)

| | Sample | | | | | | |
|---|---|---|---|---|---|---|---|
| | 1 | 2 | 3 | 4 | 5 | 6 | |
| | | | Whole Grain Heat Treatment | | | | |
| | Raw, unstabilized control | Raw, unstabilized control | 140° C./10 min | 140° C./10 min | 180°/10 min | 140°/10 min | Flavor Descriptor |
| Added Moisture (% grain wt basis) | 0 | 0 | 10 | 10 | 10 | 10 | |
| Milling Temperature (° C.) | 22 | 22 | 60-70 | 60-70 | 60-70 | 22 | |
| Sample storage | Frozen | 35° C./1 month | 35° C./1 month | Frozen | Frozen | Frozen | |
| Acid | | | | | | | |
| Hexanoic acid | 0.16 | 0.24 | 0.37 | 0.12 | 0.09 | 0.16 | cheesy, fatty |
| Alcohol | | | | | | | |
| 1-pentanol | 0.12 | 0.08 | 0.02 | 0.09 | 0.08 | 0.08 | unpleasant, ether |
| 1-hexanol | 0.18 | 0.13 | 0.03 | 0.04 | 0.03 | 0.04 | unpleasant, freshly mown grass |
| Aldehyde | | | | | | | |
| Hexanal | 3.92 | 5.40 | 3.47 | 2.22 | 2.44 | 3.11 | unpleasant, grassy, hay-like, off-green note |
| Nonanal | 0.54 | 0.55 | 1.14 | 0.88 | 1.00 | 1.31 | floral/citrus |
| Aromatic Hydrocarbons | | | | | | | |
| D-limonene | 1.63 | 0.76 | 1.32 | 1.90 | 2.05 | 2.10 | citrus bitter masker |
| Toluene | 4.35 | 9.2 | 10.15 | 3.12 | 3.89 | 14.72 | sweet, fruity |
| Styrene | 4.39 | 2.31 | 3.11 | 4.72 | 4.03 | 3.46 | sweet |
| Benzaldehyde | 0.76 | 0.33 | 0.76 | 1.61 | 1.29 | 1.11 | almond |
| Dodecane | 13.95 | 5.81 | 11.50 | 16.49 | 13.75 | 16.54 | |
| Tridecane | 5.43 | 1.68 | 3.65 | 6.85 | 5.35 | 7.10 | |

TABLE 13

Hexanal Concentration in Whole Wheat Samples Heat Treated with Different Added Moisture Content (mg/kg)

| | Sample | | | | | |
|---|---|---|---|---|---|---|
| | 1 | 2 | 3 | 4 | 7 | 8 |
| | | | Whole Grain Heat Treatment | | | |
| | Raw, unstabilized control | Raw, unstabilized control | 140° C./10 min | 140° C./10 min | 140°/10 min | 140°/10 min |
| Added Moisture (% grain wt basis) | 0 | 0 | 10 | 10 | 20 | 40 |
| Milling Temperature (° C.) | 22 | 22 | 60-70 | 60-70 | 60-70 | 60-70 |
| Sample storage | Frozen | 35° C./1 month | 35° C./1 month | Frozen | Frozen | Frozen |
| Hexanal | 3.92 | 5.40 | 3.47 | 2.22 | 4.14 | 6.49 |

The analysis showed that several volatile compounds, particularly 1-hexanol, 1-pentanol, as well as furfural alcohol, 1-ethyl,-2,3-dimethylbenzene, hexanoic acid, dimethyl sulfide and isopropanol, which may be a source of objectionable flavors in the raw wheat, were lowered from volatilization after specific heating and milling of wheat grains. Furthermore, milling the whole wheat after heat treatment while hot (>60° C.) as opposed to at ambient conditions, increased the reduction in volatile compounds by approximately 20-30%.

Hexanal formation was lowered by heat treatment conditions employed in the preferred process, both initially and after accelerated storage conditions when compared to a raw sample. Hexanal is a secondary oxidation product of linoleate and regarded as a major oxidative marker of rancidity for cereal grains. The amount of hexanal formation in heat treated whole wheat was lower than raw wheat both initially by 43% and after accelerated storage conditions by 36%. Whole wheat heat treated via the preferred process (140C/10 min, 9% added moisture) was shown to be effectively stabilized as hexanal did not increase significantly during accelerated storage (3.11 to 3.47 mg/kg) whereas raw wheat increased significantly by 27% under the same storage conditions (3.92 to 5.40 mg/kg).

However, it was found that hexanal formation increased with heat treatment at higher added moisture content (20%-40% added moisture), which is typical of other hydrothermal treatments. Both of these variables (moisture and storage time) can be attributed to increased oxidation of fatty acids in wheat germ and bran. At 10% added moisture, as used in a preferred process herein, hexanal formation is significantly lower (more than 50% lower) than other hydrothermal processes.

Heat treatment of whole wheat increased the level of aromatic hydrocarbons that are sweet or pleasant such as D-limonene, toluene, styrene and benzaldehyde.

Example 5B: Enhanced Flavor & Aroma as a Result of an Increase in Volatile Compounds from Heat Treatment Method:
Aroma Extract Dilution Analysis (AEDA)

The sample was extracted with a low boiling, freshly distilled solvent. The aroma extract was purified by high vacuum transfer (SAFE) to remove non-volatile compounds. A Gas chromatography-Olfactometry (GC-O) was performed, the odor active regions recorded and the retention indices (RI) determined. As far as the odorants are known, they were identified by RI-values (and GC-MS as far as possible). The volatile fraction was diluted stepwise 1+1 with solvent and each dilution step was evaluated by GC-O. This procedure was performed until no odorant was perceivable in the GC effluent (but limited to a maximum of 11 dilutions). The odor extract dilution analysis was performed by two trained panelists. The AEDA elicits the relevance of the single odorants when samples are compared and is accredited according DIN EN ISO/IEC 17025:2005.

Quantification of selected aroma compounds using stable isotope dilution analysis (SIDA) Quantification of selected aroma compounds via GC-MS was carried out using stable isotope dilution analysis (carried out as duplicates). This method is accredited according to DIN EN ISO/IEC 17025: 2005

Results:

TABLE 14

| | Concentration (µg/kg) | | | |
|---|---|---|---|---|
| Aroma Compound | Raw Wholegrain Flour | Biscuit made from 100% Raw WG Flour | HT Wholegrain Flour | Biscuit made from 100% HT WG Flour |
| Hexanal | 670 | 220 | 290 | 160 |
| Octanal | <2.6* | 20 | 11 | 16 |
| 1-octen-3-one | <0.81* | 1.4 | <0.81* | 1.9 |
| 2-acetyl-1-pyrroline | <1.4* | 2.8 | <1.4* | 2.8 |
| Acetic acid | 90000 | 330000 | 82000 | 350000 |
| Methional | <2.6* | 26 | 7.5 | 47 |
| (E,Z)-2,6-nonadienal | <1.1* | <1.1* | <1.1* | 1.2 |

TABLE 14-continued

|  | Concentration (µg/kg) | | | |
| --- | --- | --- | --- | --- |
| Aroma Compound | Raw Wholegrain Flour | Biscuit made from 100% Raw WG Flour | HT Wholegrain Flour | Biscuit made from 100% HT WG Flour |
| Pentanoic acid | 530 | 1700 | 530 | 3400 |
| Phenylacetaldehyde | <0.89* | 11 | 7.6 | 11 |
| (E,E)-2,4-nonadienal | 5.9 | 10 | 5.7 | 7.6 |
| (E,E)-2,4-decadienal | 2.9 | 220 | 3.4 | 90 |
| 2-methoxyphenol | 16 | 2.4 | 9.8 | 1.9 |
| Trans-4,5-epoxy-(E)-2-decenal | <3.8* | <3.8* | <3.8* | <3.8* |
| Furaneol | 10 | 1400 | 16 | 2000 |
| 4-methylphenol | 1 | 2.5 | 1.3 | 4.2 |
| Sotolone | 2.3 | 5.5 | 2.1 | 4.3 |
| Phenylacetic acid | 420 | 620 | 250 | 1500 |

Values are averages of duplicate measurements
*Limit of Detection

Interpretation of Flavor/Aroma Compound Quantification in Line with Sensory Comments 1. Sweet—Biscuits made from HT WG flour had sweeter aroma, flavor and aftertaste. Furaneol is a top note in caramel flavors: sweet, caramelic, pungent. Concentration in raw WG flour was 10 vs HT WG flour 16 (HT WG=heat treated whole grain flour in accordance with various embodiments herein). Concentration in biscuits made from raw WG flour 1400 vs 2000 in biscuits made from HT WG flour.

Phenylacetic acid is a molecule that has sweet, caramelic, honey-like aroma and flavor even in low concentrations. Concentration in biscuits made from raw HT WG flour was 620 vs 1500 in biscuits made from raw WG flour.

2. Wheat—showed mixed results in the sensory assessment, due to other characteristic compounds that are more dominant than the Wheat characteristic.

2-acetyl-1-pyrroline has typical wheat, bread crust aroma and flavor. Concentration raw vs heat treated WG flour and biscuits made from each flour was similar.

3. Baked—Biscuits made from HT WG flour showed stronger baked aroma and flavor in sensory assessment than biscuits made from raw WG flour.

4-methylphenol (p-cresol), is a molecule that is extracted industrially from coal tar, possesses: heavy, tar-like, baked, pungent aroma and flavor. Concentration in raw WG flour is 1.0 vs 1.3 in HT WG flour; in biscuits made from raw WG flour 2.5 vs 4.2 in biscuits made from HT WG flour.

Methional is a Maillard reaction compound. It possesses yeasty, bready, cooked potato, savory aroma and flavor. Concentration in raw WG flour <2.6 vs 7.5 in HT WG flour; in biscuits made from raw flour 26 vs 47 in biscuits made from HT WG flour. 2-methoxyphenol (Guaiacol) has burnt, phenol, wood aroma and flavor and is present in wood smoke. Concentration in raw WG flour 16 vs 9.8 in HT WG flour; in biscuits made from raw WG flour 2.4 vs 1.9 in biscuits made from HT WG flour.

4. Butter—Biscuits made from HT WG flour showed stronger butter aroma, flavor and aftertaste.

Pentanoic (Valeric) acid & Acetic acid are molecules that often take part in dairy type flavors. They have acidic, sharp, cheese-like, sour-milky with fruit nuances. Concentration in biscuits made from raw WG flour 1700 vs 3400 in biscuits made from HT WG flour.

5. Oil—The biscuit made from HT WG flour had a slightly lower oil aroma and flavor. (E,E)-2,4-nonadienal has strong cereal, deep fried, fatty aroma and flavor. Concentration in raw WG flour was 5.9 vs 5.7 in HT WG flour; biscuit made from raw WG flour 10 vs 7.6 in biscuit made from HT WG flour.

(E,E)-2,4-decadienal is a powerful molecule with strong fatty, deep fried, stale aroma and flavor. Concentration in biscuits made from raw WG flour was 220 vs 90 in biscuits made from HT WG flour.

6. Wheat Germ—Sensory results showed weaker wheat germ aroma, flavor and aftertaste in the biscuit containing HT WG flour.

Hexanal is powerful molecule, possesses strong aroma and flavor of green, freshly cut grass. Hexanal is generated as a secondary lipid oxidation product during storage of milled grain flour, although some was also lost during/after baking potentially via volatilisation. Hexanal was lower in both the HT WG flour and biscuit containing HT WG flour. Concentration in raw biscuit 220 vs 160 in heat treated biscuit.

Sotolone is a lactone and an extremely powerful aroma compound, with the typical smell of fenugreek or curry at high concentrations and maple syrup at lower concentrations. Concentration in raw WG flour was 2.3 vs 2.1 in HT WG flour; biscuits made from raw WG flour 5.5 vs 4.3 in biscuits made from HT WG flour.

7. Bitter—stronger bitter aroma, flavor and aftertaste in biscuits made from raw WG flour.

Octanal is an aldehyde, green with a peely citrus orange note. Concentration in raw biscuit 20 vs 16 in heat treated biscuit.

Overall, the reduction in volatile alcohols, acids and aldehydes with negative flavor and increase in volatile aromatic hydrocarbons with positive flavor, the formation of pleasant Maillard reaction products and low-level oxidation byproducts in the heat treated-milled wheat explains why the heat treated whole grain flour and end products made from the same flour has less objectionable flavor than the equivalent unstabilized whole grain flour and products made from the equivalent unstabilized whole grain flour and a more pleasant flavor profile than the commercially milled wholegrain flour.

Example 6: Reduction of Free Phenolics as a Result of Heat Treatment and Fine Grinding Total free phenolics was measured for each wholegrain wheat flour sample using a modified Folin-Ciocalteu method.

Sample Extraction:
  250 mg of each sample is accurately weighed, 10 mL 50% methanol added and sample extracted for 35 minutes with shaking. Sample is then centrifuged and clear supernatant removed. Sample is extracted twice more with 5 ml methanol fractions. Total volume of combined extracts is then made up to 25 ml.
Colorimetric Analysis:
  5 mL extracted sample is mixed with 0.5 mL Folin-Ciocalteu Reagent. Once blue color forms, 6 mL of 0.5% $Na_2CO_3$ is added. Sample is left to stand for 5 minutes, until a precipitate forms. Solutions are centrifuged to remove the precipitate, and the absorbance is read at 650 nm.
  Absorbance reading is compared to standard curve in the range of 0-100 ppm ferulic acid, in order to concentrate total phenolic concentration.
  The results are shown in TABLE 15 below:

TABLE 15

| Sample | Heat Treatment | Tempering (% Added Moisture)[1] | Grinding Temperature[2] | Whole Grain Flour Storage - 2 months | Total Free Phenolics (g/kg) | % Reduction |
|---|---|---|---|---|---|---|
| 1 | Raw (control) | 0% | 22° C. | −18° C. | 1.22 | |
| 2 | Raw (control) | 0% | 22° C. | 35° C. | 1.23 | 0.80% |
| 3 | 140° C./10 min | 0% | 60-70° C. | 35° C. | 1.04 | −14.80% |
| 4 | 140° C./10 min | 0% | 60-70° C. | −18° C. | 0.90 | −26.20% |
| 5 | 180° C./10 min | 0% | 60-70° C. | −18° C. | 0.88 | −27.90% |
| 6 | 140° C./10 min | 0% | 22° C. | −18° C. | 1.02 | −16.40% |
| 7 | 140° C./10 min | 10% | 22° C. | −18° C. | 1.19 | −2.50% |
| 8 | 140° C./10 min | 20% | 22° C. | −18° C. | 1.09 | −10.70% |

This example shows that methods herein can be used to substantially reduce phenolics content thereby producing a less bitter tasting whole grain flour. In particular, it was found that milling wheat at 60-70° C. following heat treatment gave 37% greater reduction in phenolic content than ambient (22° C.) milling. Further, tempering wheat by adding 10% moisture on grain weight basis before heat treatment gave 11% greater reduction in phenolics compared to no tempering. Finally, heat treatment temperature (140 vs 180° C.) produced no significant difference in phenolic content.

Example 7: Vitamin Retention in Heat Treated Whole Grain Flour

Retention of heat labile vitamins, including Vitamin B1 (thiamine), B2 (riboflavin), B3 (niacin) and Vitamin E (tocopherol) in biscuits made from 80% stabilized whole grain flour (heat treated as whole grains) was measured according to standard methods for vitamin analysis in foods.

TABLE 16

| Whole Grain Heat Treatment Process | | | Vitamin Content | | | |
|---|---|---|---|---|---|---|
| Temp (° C.) | Time (min) | Added Moisture before Heat Treatment (%) | Vitamin B1 (mg/kg) | Vitamin B2 (mg/kg) | Vitamin B3 (mg/kg) | Vitamin E (mg/kg) |
| Untreated | 0 | 0 | 0.022 | 0.005 | 0.34 | 0.19 |
| 140 | 10 | 10 | 0.024 | 0.005 | 0.38 | 0.19 |
| 140 | 10 | 20 | 0.023 | 0.005 | 0.37 | 0.20 |

In was found that heat treatment of whole grains using preferred processes does not significantly alter vitamin retention in finished products such as biscuits after baking.

Example 8: Baking Functionality Comparison of Break Roller Milled and Conventional Milled Whole Grain Flour Whole wheat grains were tempered and heat treated then separated into two samples for milling. One sample was milled using the preferred process of break roll milling, utilising one pass through a series of 3 break roll passages. The other sample was milled using conventional roller milling, utilising one pass through 3 break & 3 reduction roll passages in series.

TABLE 17

| | Particle Size | | Starch Damage | | Baking Functionality - Stack Height/Cookie Weight | |
|---|---|---|---|---|---|---|
| Sieve size (μm) | Break Flour % | Break + Reduction Flour % | Break Flour % | Break + Reduction Flour % | Break Flour % | Break + Reduction Flour % |
| >850 | 0.0% | 0.0% | 3.6 | 6.6 | 1.01 | 0.93 |
| >500 | 2.2% | 0.0% | | | | |
| >250 | 28.1% | 0.0% | | | | |
| >149 | 60.6% | 15.6% | | | | |
| >106 | 3.5% | 17.9% | | | | |
| >63 | 3.2% | 51.4% | | | | |
| <63 | 2.4% | 15.1% | | | | |
| Total | 100.00% | 100.00% | | | | |

This example shows that break roll milling produces a coarser flour with less starch damage, which produces better starch functionality for biscuit making as measured by stack height compared to conventional break and reduction roll milling. Greater stack height leads to less dense or firm texture in the final product, a key quality attribute for whole grain baked products.

Example 9A: Baking Quality of Heat Treated Whole Grain Flour—Biscuits

Baking functionality of stabilized whole grain wheat flour was assessed by comparison to unstabilized whole grain wheat flour and commercially available whole grain wheat flour. Whole grain flours were made with the same proportions naturally occurring in the whole grain. The baking method and formulation used to evaluate baking functionality was adapted from AACC 10-53 Cookie Test Baking standard method and is given below.

Biscuit Formulation:

The ingredients required to make one batch of rotary moulded 80% whole grain biscuits (minimum 20 biscuits) are as shown.

TABLE 18

| Ingredient | Stage | Control Weight (g) | 80% Whole Grain Weight (g) |
|---|---|---|---|
| Salt | 1 | 3.9 | 3.9 |
| Icing Sugar | 1 | 58.3 | 58.3 |
| Invert Sugar | 1 | 6.2 | 6.2 |
| Sodium bicarbonate | 1 | 0.6 | 0.6 |
| Vegetable Shortening | 1 | 83.6 | 83.6 |
| Soft White Flour | 2 | 227.8 | 45.6 |
| HT Endosperm (Break flour) fraction < 355 µm | 2 | 0 | 145.8 |
| HT Bran/Germ fraction (fine ground)[1] | 2 | 0 | 36.4 |
| Ammonium bicarbonate | 2 | 6.7 | 6.7 |
| Water | 2 | 12.9 | 12.9 |
| Total | | 400.0 | 400.0 |

[1]Contains > 250 µm fraction from bran/germ fraction and > 355 µm fraction from Endosperm (Break flour) fraction, fine ground.

Test Baking Method:
1. Load Stage 1 ingredients into mixer bowl (DoughLab 2500).
2. Mix on high speed at 250 rpm at 23° C. bowl temperature for 5 minutes.
3. Scrape down sides of bowl.
4. Dissolve Ammonium bicarbonate in water and add with other Stage 2 ingredients to mixer bowl.
5. Mix (folding) at 125 rpm at 23° C. bowl temperature for 2.5 minutes.
6. Remove dough from mixer bowl and place covered in refrigerator at 4° C. for 15 minutes.
7. Form 20 round dough pieces using a rotary moulder depositor or sheeter to final dimensions of 80 mm diameter and 2 mm thickness. Score dough pieces in the direction of sheeting and place on an aluminium baking tray.
8. Bake in a preheated Polin deck oven at 180° C. for 14-16 minutes, until even golden bake color is achieved and moisture content of 3.5-4.5%.
9. Cool for 30 minutes and retain in a sealed bag.

Assessment:

Biscuit weight, shape and thickness measurements are taken once biscuits are cooled. Width is measured by placing 5 biscuits side by side in the direction of sheeting. Length is measured by placing 5 biscuits side by side perpendicular to the direction of sheeting. Measurement is made from the outer edge of the $1^{st}$ biscuit to the outer edge of the $4^{th}$ biscuit in mm. Stack height is measured by stacking 5 biscuits and measuring the height of the stack in mm. 5 biscuits are weighed. Stack height is divided by biscuit weight to remove the variability of dough piece weight. Each measurement is repeated 4 times with new biscuits and the average of 4 readings taken. Biscuit moisture is tested using an infrared moisture analyzer. Biscuit firmness is measured using a Texture Analyzer three-point-break test to measure hardness as the force to break the biscuit.

TABLE 19

Biscuit Baking Quality with 80% Whole Grain Flour

| Sample | Dough Water Level (%) | Width (mm) | Length (mm) | Stack Height (mm) | Stack Height/ Biscuit Weight (g) | Biscuit Moisture (%) | Biscuit Firmness (N) |
|---|---|---|---|---|---|---|---|
| 1. Raw, refined soft flour control | 17 | 252 | 252 | 24 | 1.085 | 4.22 | 1305 |
| 2. Raw, unstabilized wholegrain control | 18.3 | 253 | 252.5 | 23.5 | 1.004 | 4.39 | 1143 |
| 3. HT 140° C./10 min, 0% AM, Med fine bran/germ 18036-7 | 18.3 | 250 | 251 | 19.5 | 0.891 | 3.73 | 1350 |
| 4. HT 140° C./10 min, 10% AM, Med fine bran/germ 18036-7 | 17.4 | 255 | 254 | 23.5 | 1.033 | 4.45 | 1120 |
| 5. HT 140° C./10 min, 20% AM, Med fine bran/germ 18036-7 | 17.4 | 254 | 253 | 21.5 | 0.961 | 4.64 | 1186 |
| 6. HT 180° C./10 min, 10% AM, Med fine bran/germ 18036-7 | 18.3 | 249 | 248 | 20.0 | 0.917 | 3.78 | 1565 |
| 7. HT 140° C./10 min, 10% AM, Fine bran/germ 18036-4 | 18.3 | 255 | 253 | 23.5 | 1.007 | 4.44 | 1092 |
| 8. HT 140° C./10 min, 10% AM, Ultra fine bran/germ 18036-2 | 18.3 | 253 | 252 | 22.5 | 0.970 | 4.80 | 1081 |
| 9. Commercial wholegrain flour | 18.3 | 251.5 | 250 | 21.5 | 0.953 | 4.57 | 1220 |

This example shows that biscuits prepared with 80% whole grain flour using methods described herein demonstrate comparable baking quality to untreated (raw) whole grain flour. The texture of such biscuits have similar appearance and are lighter (less firm) than biscuits made with refined white flour (without wholegrain) or commercially available wholegrain flour.

Baking functionality of stabilized whole grain wheat flour made from Soft White Wheat was assessed by comparison to stabilized whole grain wheat flour made from Low Protein Hard Wheat, unstabilized whole grain wheat flour and commercially available whole grain wheat flour. Whole grain flours were made with the same proportions naturally occurring in the whole grain. The baking method, formulation and assessment method used to evaluate baking functionality was the same as given previously for biscuits.

TABLE 20

| Sample | Dough Water Level (%) | Width (mm) | Length (mm) | Stack Height (mm) | Stack Height/ Biscuit Weight (g) | Biscuit Moisture (%) | Biscuit Firmness (N) |
|---|---|---|---|---|---|---|---|
| 1a. Low Protein Hard White Wheat: Raw, unstabilized wholegrain | 8.3 | 253 | 252.5 | 23.5 | 1.004 | 4.39 | 1143 |
| 1b. Low Protein Hard White Wheat: 140° C./10 min, 10% AM, Fine bran/germ 18036-4 | 8.3 | 255 | 253 | 23.5 | 1.007 | 4.44 | 1092 |
| 2a. Soft White Wheat: Raw, unstabilized wholegrain | 7.0 | 255 | 253 | 20.5 | 1.18 | 4.77 | 766 |
| 2b. Soft White Wheat: 140° C./10 min, 10% AM, Fine bran/germ 18037-4 | 7.3 | 255 | 254 | 22.5 | 1.16 | 4.62 | 612 |

This example shows that biscuits prepared with 80% whole grain flour from various wheat types such as Soft white wheat and Low Protein Hard wheat using methods described herein demonstrate comparable baking quality to each other as well as unstabilized whole grain flour. The texture of such biscuits have similar appearance and are lighter (less firm) when made from Soft flour than biscuits made with Low Protein hard flour, which is a desirable product attribute. Biscuits made from Low Protein Hard wheat and Soft White wheat were both lighter in texture than the otherwise comparable unstabilized control.

Example 9B: Crackers Made from Heat Treated High Protein Hard White Wheat

Baking functionality of stabilized whole grain wheat flour made from High Protein Hard White Wheat was assessed by comparison to stabilized whole grain wheat flour made from Low Protein Hard Wheat, unstabilized whole grain wheat flour and commercially available whole grain wheat flour. Whole grain flours were made with the same proportions naturally occurring in the whole grain. The baking formulation, method and assessment used to evaluate baking functionality is given below.

Cracker Formulation:

The ingredients required to make one batch of sheeted 80% whole grain crackers (minimum 20 biscuits) are as shown.

TABLE 21

| Ingredient | Stage | Control Weight (g) | 80% Whole Grain Weight (g) |
|---|---|---|---|
| Salt | 1 | 4 | 4 |
| Sodium bicarbonate | 1 | 2 | 2 |
| Shortening | 1 | 5.2 | 5.2 |
| HT Endosperm (Break flour) fraction < 355 μm | 1 | 0 | 226 |
| HT Bran/Germ fraction (fine ground)[1] | 1 | 0 | 56 |
| High Protein Hard White Flour | 1 | 282 | 0 |
| Water | 1 | 33 | 33 |
| Dried Yeast | 2 | 17.7 | 17.7 |
| High Protein Hard White Flour | 2 | 20.3 | 20.3 |
| Dextrose | 2 | 5.1 | 5.1 |
| Water (35° C.) | 2 | 100 | 100 |
| Total | | 400.0 | 400.0 |

[1]Contains > 250 μm fraction from bran/germ fraction and > 355 μm fraction from Endosperm (Break flour) fraction, fine ground.

Test Baking Method:
1. Make a yeast slurry in a beaker by combining Stage 2 ingredients and stir until foaming strongly (at least 10 minutes).
2. Load Stage 1 ingredients into mixer bowl (DoughLab 2500) and blend on slow speed for 1 minute.
3. Add yeast slurry and mix for 4 to 5 minutes at 200 rpm, target temperature is 35° C.
4. Remove dough from mixer bowl and proof covered at 35° C. for 2 hours.
5. Sheet the dough through gauge 15, 7, then 2.
6. Fold the dough into 4 layers and cut the sides to roller width.
7. Turn the dough 90° and sheet through gauge 4, 2, and then 1 to a final thickness of 1-2 mm.
8. Docker and cut into 20 round biscuits. Score dough pieces in the direction of sheeting and place on an aluminium baking tray.
9. Bake in a preheated Polin deck oven at 200° C. for 14 minutes, or until even golden bake color is achieved and moisture content of 2-4%.
10. Cool for 30 minutes and retain in a sealed bag.

Assessment:

Cracker weight, shape and thickness measurements are taken once crackers are cooled. Width is measured by placing 5 crackers side by side in the direction of sheeting. Length is measured by placing 5 crackers side by side perpendicular to the direction of sheeting. Measurement is made from the outer edge of the $1^{st}$ cracker to the outer edge of the $4^{th}$ cracker in mm. Stack height is measured by stacking 5 cracker and measuring the height of the stack in mm. 5 cracker are weighed. Stack height is divided by cracker weight to remove the variability of dough piece weight. Each measurement is repeated 4 times with new biscuits and the average of 4 readings taken. Cracker moisture is tested using an infrared moisture analyzer. Cracker firmness is measured using a Texture Analyzer three-point-break test to measure hardness as the force to break the cracker.

TABLE 22

| Sample | Dough Water Level (%) | Width (mm) | Length (mm) | Stack Height (mm) | Stack Height/ Biscuit Weight (g) | Biscuit Moisture (%) | Biscuit Firmness (N) |
|---|---|---|---|---|---|---|---|
| 1a. Low Protein Hard White Wheat: Raw, unstabilized wholegrain | 129 | 232 | 227 | 26.0 | 1.58 | 2.6 | 3895 |
| 1b. Low Protein Hard White Wheat: 140° C./10 min, 10% AM, Fine bran/germ 18036-4 | 130 | 233 | 228 | 27.8 | 1.69 | 2.9 | 3639 |
| 2a. High Protein Hard White Wheat: Raw, unstabilized wholegrain | 131.5 | 233 | 237 | 30.3 | 1.65 | 2.8 | 4188 |
| 2b. High Protein Hard White Wheat: 140° C./10 min, 10% AM, Fine bran/germ 18038-4 | 132.5 | 230 | 234 | 30.8 | 1.72 | 2.2 | 3973 |

This example shows that crackers prepared with 80% whole grain flour from various wheat types such as High Protein hard white wheat and Low Protein Hard white wheat using methods described herein demonstrate comparable baking quality to each other as well as unstabilized whole grain flour. The texture of such crackers have similar appearance and are lighter (less firm) when made from Low Protein Hard white flour than crackers made with High Protein hard white flour, which is a desirable product attribute. Biscuits made from High Protein Hard wheat and Low Protein White wheat were both lighter in texture than the otherwise comparable unstabilized control.

Example 9C: Baking Quality of Heat Treated Whole Grain Flour—Bread

Bread Formulation:

The ingredients required to make 6 mini open top loaves of white or 50% wholegrain bread are as shown. Gluten was omitted from formulations to provide greater distinction between flour performance.

TABLE 23

| | Control Weight (g) | 50% Whole Grain Weight (g) |
|---|---|---|
| White Refined High Protein Bakers Flour | 753.23 | 376.62 |
| HT Low Protein Wheat Endosperm (Break flour) fraction < 355 μm | 0.00 | 301.29 |
| HT Low Protein Wheat Bran/Germ fraction (fine ground)[1] | 0.00 | 75.32 |
| Water | 391.19 | 391.19 |
| Dry Yeast | 10.46 | 10.46 |
| Oil | 15.07 | 15.07 |
| Sugar | 75.78 | 75.78 |
| Improver | 3.77 | 3.77 |
| Whey | 15.07 | 15.07 |
| Salt | 18.83 | 18.83 |
| Butter | 10.17 | 10.17 |
| Emulsifier | 6.02 | 6.02 |
| Citric Acid | 0.41 | 0.41 |
| Total | 1300.00 | 1300.00 |

[1]Contains > 250 μm fraction from bran/germ fraction and > 355 μm fraction from Endosperm (Break flour) fraction, fine ground.

Test Baking Method:
1. Weigh all dry ingredients together except sugar and yeast.
2. Use 10 g of the sugar to proof the yeast. Add 100 ml of the total water into a beaker on a stir plate and add sugar then yeast. When yeast mixture foams, add to mixer with remaining water.
3. Premix dry ingredients on speed 1 using dough hook then add butter and emulsifier.
4. Add proofed yeast mixture and remaining water slowly on speed 1.
5. Add oil when dough forms. Set to speed 2 and start mixing time.
6. Mix on speed 2 until dough develops and clears
7. Allow dough to rest for 7 min then split into 195 grams
8. Cut dough into 195 g balls and record weight.
9. Roll onto floured surface in a rectangle the width of the pans length.
10. Spray with water mist, roll into loaf and place in greased mini pan seam down.
11. Proof @ 110° F. until dough rises 1" above pan.
12. Bake in rotary oven @ 400° F. for 25 minutes to an internal temperature of 205° F.
13. Remove immediately from pan and allow to cool on rack.

Assessment:

Mix time was determined by the time to mix each dough to obtain a gluten window indicative of optimal dough development. Proof time was the time taken for dough to rise to 1 inch above the side of the bread pan. Bread loaf volume was determined by laser topography according to AACC Method 10-16.01 once loaves were cooled. Six loaves were weighed and scanned then results averaged. Bread moisture was tested using an infrared moisture analyzer. Bread firmness and resilience was measured using a Texture Analyzer utilising the standard TPA test. Three TPA measurements were taken from each loaf consisting of 2 slices per measurement. Measurements were taken on Day 1, 2 and 3 after baking and results averaged.

Results:

TABLE 24

Bread Baking Quality with 50% Whole Grain (High Protein Hard Wheat) Flour

| Sample | Dough Water Level (%) | Mix Time (mm) | Proof Time (mm) | Loaf Volume (cm³) | Bread Moisture (%) | Bread Firmness (N) | Bread Resilience (N) |
|---|---|---|---|---|---|---|---|
| 1. Refined, high protein hard flour control | 391.19 | 7.3 | 64 | 670 | 30.8 | 772 | 3.1 |
| 2. Commercial, high protein hard wholegrain flour | 411.5 | 7.3 | 66 | 663 | 31.6 | 690 | 3.0 |
| 3. Raw, unstabilized wholegrain flour control | 420.1 | 7.8 | 69 | 641 | 31.2 | 901 | 3.1 |
| 4. HT 140° C./10 min, 10% AM, Fine bran/germ 18036-4 flour | 422.5 | 9.2 | 70 | 551 | 32.3 | 1088 | 3.1 |

Baking functionality of stabilized whole grain wheat flour made from High Protein Hard White Wheat was assessed by comparison to stabilized whole grain wheat flour made from Low Protein Hard Wheat, unstabilized whole grain wheat flour and commercially available whole grain wheat flour. Whole grain flours were made with the same proportions naturally occurring in the whole grain. The baking method, formulation and assessment method used to evaluate baking functionality was the same as given previously for bread.

Results:

TABLE 25

| Sample | Dough Water Level (%) | Mix Time (mm) | Proof Time (mm) | Loaf Volume (cm³) | Bread Moisture (%) | Bread Firmness (N) | Bread Resilience (N) |
|---|---|---|---|---|---|---|---|
| 1a. Low Protein Hard White Wheat: Raw, unstabilized wholegrain | 402.5 | 8.9 | 70 | 598 | 31.5 | 788 | 3.0 |
| 1b. Low Protein Hard White Wheat: 140° C./10 min, 10% AM, Fine bran/germ 18036-4 | 405.5 | 8.9 | 95 | 513 | 32.4 | 890 | 3.0 |
| 2a. High Protein Hard White Wheat: Raw, unstabilized wholegrain | 420.1 | 7.8 | 69 | 641 | 31.2 | 901 | 3.1 |
| 2b. High Protein Hard White Wheat: 140° C./10 min, 10% AM, Fine bran/germ 18038-4 | 422.5 | 9.2 | 70 | 551 | 32.3 | 1088 | 3.1 |

This example shows that bread prepared with 50% heat treated whole grain flour using methods described herein demonstrate similar baking quality to both untreated and commercial whole grain flour. Loaf volume of bread made with 50% heat treated WG flour is slightly reduced by 14% compared to the 50% untreated WG control due to slight heat induced changes to starch and gluten properties but the reduction is expected to be overcome with slight adjustment to heat treatment conditions and/or recipe adjustments such as gluten addition. The crumb softness is comparable and flavor is noticeably improved in bread made with heat treated WG flour compared to both the untreated and commercial WG flour. Bread made with heat treated WG flour showed a noticeable reduction in negative flavor attributes such as bitterness, wheatiness and sourness and improvement in positive flavor attributes such as sweetness and butteryness.

Example 10A: Sensory Evaluation of Biscuit Samples Made with Heat Treated Whole Grain Flour The objective was to describe perceptible sensory differences between 80% whole grain biscuit samples made with heat treated whole grain flour, an otherwise comparable unstabilized whole grain flour and a commercial, stabilized whole grain flour.

Method:

Biscuit samples were prepared as in Example 8 and stored for 1 month prior to assessment. Samples were evaluated by 4 untrained but experienced food industry professionals. A standardized vocabulary with definitions to describe aroma, flavor, aftertaste, mouthfeel and texture was presented to the panelists and discussed as a group with appropriate reference samples used as a guide. Panelists were asked to make a pairwise comparison between samples and assign each sample as greater or less than the other for each attribute using the standardized vocabulary definition. The samples were evaluated by panelists individually and not discussed as a group to arrive at a consensus on sample differences.

Samples:
1. Heat Treated Whole Grain ("HT WG") Flour=Sample 7 from Table 19 above –140° C./10 min, 10% AM, Fine bran/germ 18036-4
2. Unstabilized Whole Grain ("UWG") Flour=Sample 2 from Table 19 above
3. Commercial, Stabilized Whole Grain ("CWG") Flour=Sample 9 from Table 19 above Results:

TABLE 26

| HT WG Flour &[1] | UWG Flour | CWG Flour | UWG Flour | CWG Flour | UWG Flour | CWG Flour |
|---|---|---|---|---|---|---|
| Aspect Descriptor | Aroma | | Flavor | | Aftertaste | |
| Sweet | ---- | ---- | ---- | ---- | ---- | ---- |

TABLE 26-continued

| HT WG Flour &[1] | UWG Flour | CWG Flour | UWG Flour | CWG Flour | UWG Flour | CWG Flour |
|---|---|---|---|---|---|---|
| Wheat | +--0 | +--0 | +--- | +--- | +--0 | +-- |
| Baked | +--- | ++-- | +--- | ++-- | ++-- | ++-0 |
| Butter | ---- | ---- | ---- | ---- | ---0 | ---- |
| Oil | ++-0 | ++00 | ++-0 | +++0 | +++- | +++0 |
| Wheat Germ | ++++ | ++00 | ++++ | +-00 | +++0 | ++-- |
| Bitter | ++++ | ++++ | ++++ | ++++ | ++++ | ++++ |
| Color | | | | | | |
| Brown Bake | ++00 | ++++ | | | | |
| Edge Contrast | +++0 | +++0 | | | | |
| Texture/ Mouthfeel | | | | | | |
| Rough exterior | ++00 | +++0 | | | | |
| Initial Bite Firmness | ++++ | ++++ | | | | |
| Crunchy | ---- | ---0 | | | | |
| Crumbly | +--0 | +-00 | | | | |
| Dryness | +++0 | ++-0 | | | | |

TABLE 26-continued

| HT WG Flour &[1] | UWG Flour | CWG Flour | UWG Flour | CWG Flour | UWG Flour | CWG Flour |
|---|---|---|---|---|---|---|
| Dissolvability | ---- | ---- | | | | |
| Grittiness | +++- | +++- | | | | |
| Mouthcoating | ++-0 | +++0 | | | | |
| Toothpacking | ++++ | ++++ | | | | |

Figure 3:
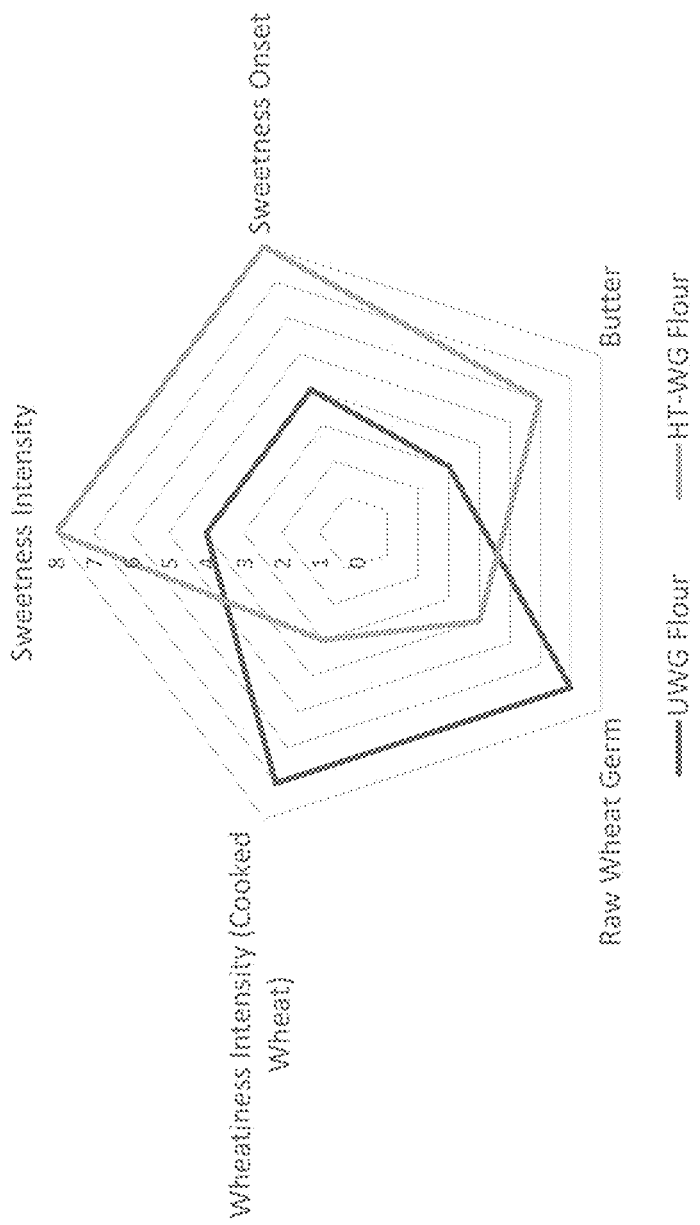
FIG. 3 is a chart showing key sensory attributes of cookies made with 80% wholegrain flour (unstabilized vs. stabilized in accordance with embodiments herein) as evaluated in Example 10A herein.

[1] Results shown (+/−) are for HT WG Flour as compared to UWG or CWG flour.
+ = More than,
− = Less than,
0 = No difference Participants evaluated the intensity of the key aroma, flavor and aftertaste attributes in addition to visual appearance (color), texture and mouthfeel attributes in biscuits made from each of the whole grain flour samples. Data shown in FIG. 3 is the 4 participants individual ratings for key sensory attributes of cookies made with 80% wholegrain flour (unstabilized UWG or commercial CWG vs. stabilized HT-WG in accordance with embodiments herein).

This example shows that biscuits made with 80% Heat Treated whole grain flour using methods described herein reduce negative flavor/aroma attributes including wheat germ and bitter and reduce negative textural attributes including firmness and toothpacking. In addition, favourable flavor/aroma attributes were enhanced including sweet and butter and textural attributes including crunchy and dissolvability. Grittiness and dryness was either reduced or comparable to the untreated and commercial samples.

Example 10B: Sensory Evaluation of Bread Samples Made with Heat Treated Whole Grain Flour The objective was to describe perceptible sensory differences between 50% whole grain bread samples made with heat treated whole grain flour, an otherwise comparable unstabilized whole grain flour and a commercial whole grain flour.

Method:

Bread samples were prepared as in Example 9 and stored for 3 days prior to assessment. Samples were evaluated by 7 untrained but experienced food industry professionals. A standardized vocabulary (see Appendix below) with definitions to describe aroma, flavor, aftertaste, mouthfeel and texture was presented to the panelists and discussed as a group with appropriate reference samples used as a guide. Panelists were asked to make a pairwise comparison between samples and assign each sample as greater or less than the other for each attribute using the standardized vocabulary definition. The samples were evaluated by panelists individually then discussed as a group to arrive at a consensus on sample differences.

Scale used for HT WG flour:

TABLE 1

Heat Treated Whole Grain Flour vs. White Flour, Untreated (UWG) and Commercial (CWG) Whole Grain Flour

| −5 | −4 | −3 | −2 | −1 | 0 | 1 | 2 | 3 | 4 | 5 |
|---|---|---|---|---|---|---|---|---|---|---|
| Less than W, UWG or CWG | | | | | Same | | | | | More than W, UWG or CWG |

TABLE 27

| | HT WG Flour &[1] | | |
|---|---|---|---|
| Descriptor | White | UWG | CWG |
| Aroma/Flavor | | | |
| Baked note | 0 | 0 | 1 |
| Wheaty/Whole Wheat | 3 | 0 | −3 |
| Oil | 0 | 0 | 0 |
| Sweet | 1 | 3 | 2 |
| Sour | 0 | −3 | −3 |
| Buttery | 1 | 3 | 2 |
| Bitter | 3 | −3 | −2 |
| Appearance | | | |
| Crust Color | −1 | 1 | −3 |
| Crumb Color | −3 | 0 | −3 |
| Crumb Structure | 1 | 0 | 1 |
| Particles on surface or crumb | −2 | 0 | −2 |
| Texture (Hand feel) - Crumb | | | |
| Firmness | −2 | −1 | −1 |
| Bendy | −2 | −1 | −1 |
| Springiness | −1 | 0 | −1 |
| Moistness | 0 | −1 | 0 |
| Grittiness | 3 | −1 | 1 |

[1] Results shown (+/−) are for Heat Treated Whole Grain (HT WG) Flour as compared to White (Wh), Untreated Whole Grain (UWG) or Commercial Whole Grain (CWG) Flour.
Crumb Structure: + = open, − = tight
Particles on surface or crumb: dark small particles
Firmness: by pressing crumb with one finger, evaluation of how much force its applied to the crumb
Bendy: does it bends (elastic) or breaks when bread is folded
Springiness: by pressing crumb with one finger, evaluation of how much and how fast it bounces back
Moistness: how much moister (or dryer) the crumb is to the touch This example shows that bread prepared with 50% heat treated whole grain flour using methods described herein demonstrate similar baking quality to both untreated and commercial whole grain flour. Loaf volume of bread made with 50% heat treated WG flour is slightly reduced by 14% compared to the 50% untreated WG control due to slight heat induced changes to starch and gluten properties but the reduction is expected to be overcome with slight adjustment to heat treatment conditions and/or recipe adjustments such as gluten addition. The crumb softness is comparable and flavor is noticeably improved in bread made with heat treated WG flour compared to both the untreated and commercial WG flour. Bread made with heat treated WG flour showed a noticeable reduction in negative flavor attributes such as bitterness, wheatiness and sourness and improvement in positive flavor attributes such as sweetness and butteryness.

Example 11—Effect of Tempering & Heat Treatment on a Range of Whole Wheat Sample Types Samples of a wide range of different types and grades of wheat were processed at 140° C./10 min, 9-10% added moisture to understand whether the heat treatment process could be extended to a range of wheat types and achieve a similar effect on stabilisation and functionality. All wheats tested were comprised of a commercial blend of Australian cultivars apart from the US Soft White Wheat.

TABLE 28

| | Format | Protein (%) Wheat | Moisture (%) Wheat | Starch Damage (%) Flour | Ash (%) Flour |
|---|---|---|---|---|---|
| Low Protein Hard White Wheat | Raw | 10.0 | 11 | 4 | 0.62 |
| | HT | | 14.1 | 3.4 | 0.68 |
| High Protein Hard White Wheat | Raw | 12.2 | 10.5 | 3.4 | 0.70 |
| | HT | | 13.4 | 3.2 | 0.65 |
| Durum Wheat | Raw | 13.9 | 10.5 | 4.3 | 0.94 |
| | HT | | 13.6 | 3.1 | 0.87 |
| Soft White Wheat | Raw | 9.3 | 9.6 | 3 | 0.72 |
| | HT | | 12.5 | 3.1 | 0.65 |
| Soft White Wheat (US) | Raw | 9.9 | 8.9 | 3.2 | 0.63 |
| | HT | | 12.0 | 3.1 | 0.65 |

TABLE 29

| | Format | Lipase activity (Initial) | Lipase activity (Initial) % Reduction | Lipase activity (30 days Accelerated Storage) Wheat | FFA (Initial) | FFA (30 days Accelerated Storage) |
|---|---|---|---|---|---|---|
| Low Protein Hard White Wheat | Raw | 4.25 | | 4.32 | 0.12 | 0.81 |
| | HT | 2.51 | 41 | 3.20 | 0.07 | 0.35 |
| High Protein Hard White Wheat | Raw | 4.35 | | 4.48 | 0.11 | 0.78 |
| | HT | 2.64 | 39 | 3.29 | 0.07 | 0.32 |
| Durum Wheat | Raw | 4.46 | | 4.44 | 0.13 | 0.96 |
| | HT | 2.68 | 40 | 3.21 | 0.05 | 0.34 |
| Soft White Wheat | Raw | 4.01 | | 4.09 | 0.08 | 0.76 |
| | HT | 2.47 | 38 | 3.23 | 0.05 | 0.19 |
| Soft White Wheat (US) | Raw | 3.97 | | 4.01 | 0.07 | 0.73 |
| | HT | 2.38 | 40 | 3.14 | 0.04 | 0.18 |

The results indicate that the heat treatment has a similar and predictable effect on different wheat types in terms of stabilization effect. The reduction in lipase ranged from 38-41% between the samples tested.

TABLE 30

| | | RVA (Std 1 Profile) | | | | DSC | | | Enthalpy |
|---|---|---|---|---|---|---|---|---|---|
| | | Peak viscosity (RVU) | Peak normalised (RVU) | Breakdown (RVU) | Final viscosity (RVU) | Onset Temp - Tg (° C.) | End Temp - Tg (° C.) | Enthalpy (J/g) | change from Raw (%) |
| Low Protein Hard White Wheat | Raw | 234 | | 90 | 231 | 64.6 | 78.6 | 0.7532 | |
| | HT | 268 | 34 | 100 | 249 | 63.4 | 78.6 | 0.6678 | 88.7 |
| High Protein Hard White Wheat | Raw | 212 | | 89 | 209 | 66.6 | 79.4 | 0.6073 | |
| | HT | 285 | 73 | 117 | 280 | 64.5 | 76.3 | 0.4378 | 72.1 |
| Durum Wheat | Raw | 184 | | 72 | 199 | 66.6 | 77.3 | 0.6906 | |
| | HT | 245 | 61 | 83 | 266 | 65.2 | 80.7 | 0.4852 | 70.3 |
| Soft White Wheat | Raw | 210 | | 88 | 212 | 65.2 | 79.4 | 0.7508 | |
| | HT | 258 | 48 | 105 | 255 | 65.4 | 77.8 | 0.6203 | 82.6 |
| Soft White Wheat (US) | Raw | 197 | | 83 | 201 | 66.2 | 77.5 | 0.3945 | |
| | HT | 224 | 27 | 98 | 237 | 65.4 | 77.5 | 0.3358 | 85.1 |

The results indicate that heat treatment had less effect on the starch functionality of wheat types with lower hardness, such as soft wheat and low protein hard wheat. Wheat types with greater hardness, such as high protein hard and durum wheat had larger increases in peak and final RVA viscosity and larger reductions in DSC enthalpy (Enthalpy change from Raw) after heat treatment.

Example 12: Comparison of Particle Size of Coarse Break Endosperm and Bran in Different Wheat Types There was minimal variation between the Coarse break flour particle size of the different wheat types analyzed reflecting similar milling properties through the break milling process. Standard deviation in particle size of Coarse break milled flour ranged from 0.4-3.2%.

There was low but slightly more variation in the Coarse bran particle size after break milling. Standard deviation ranged from 0.2-6.7%. Low Protein Hard, Soft White & US Soft White wheats were closer in milling properties as measured by particle size analysis compared to High Protein Hard and Durum wheat. In the Low Protein Hard and Soft samples there was a greater proportion of larger bran particles (>850 um) in the Coarse Bran fraction compared to the High Protein Hard and Durum wheat samples due to differences in grain hardness.

These results indicate the milling process described herein can be utilized to produce flour and bran of similar physical specification and hence functionality for a variety of end uses; for example, Soft wheat for cookies, High Protein Hard wheat for bread and crackers and Durum wheat for pasta.

Particle Size Analysis
Coarse Break Flour Fraction

TABLE 32

| Particle Size (μm) | Average | SD | Range |
|---|---|---|---|
| >500 | 6.3% | 0.4% | 1.3% |
| >355 | 16.1% | 1.7% | 6.2% |
| >300 | 13.2% | 2.9% | 7.7% |
| >250 | 7.9% | 3.2% | 9.9% |
| >125 | 34.8% | 3.1% | 9.7% |
| >106 | 5.1% | 1.4% | 4.3% |
| >63 | 13.7% | 2.8% | 8.8% |
| <63 | 2.9% | 1.7% | 5.1% |
| Total | | | |

Coarse Break Bran/Germ Fraction

TABLE 33

| Particle Size - overs (μm) | Raw Low Protein Hard White 65UU | HT Low Protein Hard White 62UU | Raw Soft White 66UU | HT Soft White 56SS | Raw High Protein Hard White 67UU | HT High Protein Hard White 57SS | Raw Durum 63UU | HT Durum 58SS | Raw US Soft White 653Y | HT US Soft White 654Y |
|---|---|---|---|---|---|---|---|---|---|---|
| >850 | 64.1% | 65.3% | 67.5% | 63.4% | 53.9% | 57.9% | 53.4% | 48.9% | 68.9% | 62.0% |
| >500 | 28.5% | 29.8% | 27.4% | 31.7% | 41.2% | 37.0% | 41.4% | 46.0% | 26.5% | 31.7% |
| >355 | 3.2% | 1.3% | 2.3% | 1.5% | 1.9% | 1.6% | 3.3% | 2.0% | 2.1% | 1.9% |
| >250 | 0.8% | 0.5% | 0.5% | 0.0% | 0.5% | 0.5% | 0.5% | 0.5% | 0.5% | 0.0% |
| >125 | 2.1% | 1.1% | 1.1% | 3.1% | 1.0% | 1.7% | 1.2% | 1.4% | 0.7% | 3.1% |
| >63 | 1.3% | 1.4% | 1.0% | 0.3% | 1.3% | 1.0% | 0.3% | 1.0% | 1.2% | 1.3% |
| <63 | 0.0% | 0.5% | 0.2% | 0.0% | 0.2% | 0.3% | 0.0% | 0.2% | 0.2% | 0.0% |
| Total | 100% | 100% | 100% | 100% | 100% | 100% | 100% | 100% | 100% | 100% |

TABLE 34

| Particle Size - overs (μm) | Average | SD | Range |
|---|---|---|---|
| >850 | 60.5% | 6.7% | 20.0% |
| >500 | 34.1% | 6.8% | 19.5% |
| >355 | 2.1% | 0.7% | 2.0% |
| >250 | 0.4% | 0.2% | 0.8% |
| >125 | 1.6% | 0.9% | 2.5% |
| >63 | 1.0% | 0.4% | 1.2% |
| <63 | 0.2% | 0.2% | 0.5% |
| Total | | | |

TABLE 31

| Particle Size (μm) | Raw Low Protein Hard White 65UU | HT Low Protein Hard White 62UU | Raw Soft White 66UU | HT Soft White 56SS | Raw High Protein Hard White 67UU | HT High Protein Hard White 57SS | Raw Durum 63UU | HT Durum 58SS | Raw US Soft White 653Y | HT US Soft White 654Y |
|---|---|---|---|---|---|---|---|---|---|---|
| >500 | 6.7% | 5.8% | 6.6% | 6.2% | 6.3% | 6.0% | 7.1% | 6.2% | 6.5% | 5.8% |
| >355 | 18.0% | 12.7% | 17.2% | 14.9% | 16.7% | 15.6% | 18.9% | 15.6% | 15.6% | 16.3% |
| >300 | 11.3% | 9.2% | 15.8% | 16.6% | 11.3% | 10.7% | 16.8% | 10.6% | 14.9% | 15.1% |
| >250 | 7.1% | 11.7% | 6.0% | 4.4% | 9.6% | 8.9% | 13.7% | 8.9% | 4.9% | 3.8% |
| >125 | 35.3% | 32.7% | 31.3% | 39.8% | 33.3% | 34.9% | 30.1% | 34.8% | 35.8% | 39.5% |
| >106 | 7.7% | 6.0% | 6.3% | 4.5% | 4.2% | 3.5% | 5.2% | 3.5% | 5.7% | 4.1% |
| >63 | 13.7% | 16.7% | 13.6% | 12.1% | 15.2% | 17.0% | 8.1% | 16.9% | 12.1% | 11.6% |
| <63 | 0.1% | 5.2% | 3.2% | 1.7% | 3.5% | 3.4% | 0.1% | 3.4% | 4.5% | 3.8% |
| Total | 100% | 100% | 100% | 100% | 100% | 100% | 100% | 100% | 100% | 100% |

Appendix: Sensory Attributes, Attribute Definitions and Judge Instructions

The sensory attributes, attribute definitions, and judge or panelist instructions for making the sensory attribute evaluations are shown below:

Aroma Judge instructions: Lift the sample to the nose and evaluate the following aroma attributes:

Attribute Definition

SWEET The intensity of a sweet aroma of any kind, including brown sugar or cooked white sugar (weak-strong).

WHEAT The intensity of wheat aroma, reminiscent of wheat flour or whole wheat bread, possibly similar to a wheat berry (weak-strong)

BAKED The intensity of baked aroma, with samples on the high end of the scale being over-baked close to burnt (weak-strong)

BUTTER The intensity of butter aroma, like fresh unsalted table butter or melted butter (weak-strong)

OIL The intensity an oil aroma, which could be any type of oil aroma. This could include a stale oil aroma with a rancid off-note like an expired cookie or like over-used cooking oil (weak-strong)

WHEAT GERM The intensity of wheat germ aroma, reminiscent to milled fractions of wheat germ or wheat germ oil (weak-strong)

BITTER The intensity of bitter aroma, like expired cooking oil (weak-strong)

Appearance—

Judge Instructions: Look at the sample and evaluate the following appearance attributes:

Attribute Definition

BROWN BAKE COLOR The intensity of the brown color of the top of the cookie, ranging from light brown to darker brown (light-dark)

EDGE COLOR CONTRAST The intensity of the color of the edges, with samples on the higher end of the scale appearing to have darker near burnt edges (low-high)

Hand Touch—

Judge Instructions: While holding the sample, evaluate the following hand touch and appearance attributes.

Attribute Definition

ROUGH EXTERIOR The measure of how rough the top surface of the baked product feels (slightly-very)

Texture/Mouthfeel—

Judge Instructions: Take 1 bite with the front teeth and evaluate the following:

INITIAL BITE FIRMNESS The measure of how hard it is to bite the baked sample

Judge Instructions: Continue to chew the sample with your molars and evaluate the following:

Attribute Definition

CRUNCHY When the cookie is placed between the molars and chewed once, crunchy is the measure of the low pitch heard during the first few chews. A cookie that is only slightly crunchy may crunch like a Chewy Granola Bar, where a cracker that is very crunchy may crunch like a Crunchy Granola Bar (slightly-very)

CRUMBLY The measure of how crumbly the cookie is in the mouth after 1-2 chews. A cookie that is only slightly crumbly may crumble like a Ginger Snap cookie. A cookie that is very crumby may crumble like shortbread (slightly-very)

DRYNESS The measure of how dry the cookie feels in the mouth as noticed after 1-2 chews (slightly-very)

DISSOLVABILITY The measure of how quickly the cookie dissolves, or breaks down, as it's being chewed to the point of swallow (slow-quick)

GRITTINESS The amount of noticeable particles in the mouth similar to corn meal or corn bread (a little-a lot)

MOUTHCOATING The measure of any kind of mouthcoating, which could include an oily or pasty mouthcoat. Slimy feeling (slightly-very)

TOOTHPACKING The measure of how much cookie is stuck in the teeth during the evaluation and after swallowing/expectorating (slightly-very)

Flavor—

Judge Instructions: Take 1 bite at a time, chew, and evaluate the following flavor attributes:

Attribute Definition

SWEET The intensity of a sweet taste (of any kind), which could be reminiscent of sugar or brown sugar (weak-strong)

WHEAT The intensity of wheat flavor reminiscent of wheat flour, a grainy possibly similar to a wheat berry (weak-strong)

BAKED The intensity of baked flavor, with samples on the high end of the scale tasting more overbaked (weak-strong)

BUTTER The intensity of a butter flavor, like fresh unsalted table butter or melted butter.
(weak-strong)

OIL The intensity an oil flavor, which could be any type of oil. This could include a stale oil aroma with a rancid off-note like an expired cookie (weak-strong)

BITTER The intensity of a bitter flavor, due to rancid oil bitter (weak-strong)

Aftertaste/Aftereffect—

Judge Instructions: Take a bite of the cookie, chew and swallow. Wait 15 seconds after swallowing to evaluate the following aftertaste/aftereffect attributes:

Attribute Definition

SWEET The intensity of a sweet aftertaste in the mouth (weak-strong)

WHEAT The intensity of wheat aftertaste reminiscent of wheat flour, a grainy possibly similar to a wheat berry (weak-strong)

BAKED The intensity of a baked flavor aftertaste, with samples on the high end of the scale
tasting more overbaked (weak-strong)

BUTTER The intensity of a butter flavor aftertaste, like fresh unsalted table butter or melted butter (weak-strong)

OIL The intensity an oil flavor, which could be any type of oil. This could include a stale oil aroma with a rancid off-note like an expired cookie (weak-strong)

BITTER The intensity of a bitter aftertaste in the mouth due to rancid oil bitter, similar to expired mixed nuts (weak-strong)

The embodiments described herein are not intended to be exhaustive or to limit the invention to the precise forms disclosed in the following detailed description. Rather, the embodiments are chosen and described so that others skilled in the art can appreciate and understand the principles and practices. Therefore, it should be understood that many variations and modifications may be made while remaining within the spirit and scope herein.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

The invention claimed is:

1. A method of producing a whole grain flour comprising
tempering whole grain in water at a temperature below 60 degrees Celsius for about 60 to 90 minutes to adjust the moisture content of the whole grain to be from 15 to 20 wt. %;
heating only the whole grain, after the operation of tempering, to a temperature of about 140 degrees Celsius to about 160 degrees Celsius for about 13 to 20 minutes;
conditioning the whole grain, after the operation of heating, to adjust the moisture content to be from 15 to 17 wt. %;
milling the whole grain, after the operation of conditioning, to form a bran and germ component and a break flour component;
separating the bran and germ component from the break flour component to form a bran and germ fraction and a break flour fraction;
fine milling at least a portion of the bran and germ fraction; and
recombining the bran and germ fraction with the break flour fraction.

2. The method of claim 1, wherein heating the whole grain lowers the moisture content of the whole grain to a level of 8 to 17 wt. %.

3. The method of claim 1, wherein heating the whole grain results in gelatinization of less than about 12% of the starch present in the whole grain as measured by starch peak enthalpy change.

4. The method of claim 1, wherein heating reduces the amount of 1-hexanol by at least 50%.

5. The method of claim 1, wherein milling the whole grain is performed while the grain is at least 60 degrees Celsius.

6. The method of claim 1, wherein milling the whole grain result in starch damage of less than about 4% as measured per AACCI 76-31.01.

7. The method of claim 1, further comprising separating the bran and germ fraction into a coarse bran and germ fraction and a fine bran and germ fraction, wherein the coarse bran and germ fraction comprises at least 90% by weight particles of greater than 250 μm in size and the fine bran and germ fraction comprising at least 90% by weight particles of less than 250 μm in size.

8. The method of claim 1, wherein the whole grain flour exhibits a lipase activity of less than about 1.7 μ·mol p-NPB/hr/0.1 g.

9. The method of claim 1, wherein the level of free fatty acids are less than 0.15 wt. %.

10. The method of claim 1, wherein milling the whole grain is performed using a corrugated break roller.

* * * * *